US012030201B2

(12) United States Patent
Maimone et al.

(10) Patent No.: US 12,030,201 B2
(45) Date of Patent: Jul. 9, 2024

(54) RAZOR WITH HANDLE HAVING ARTICULABLE JOINT

(71) Applicant: FlexHanlde, L.L.C., Wilmington, DE (US)

(72) Inventors: Michael J. Maimone, Wilmington, DE (US); Jaydine M. Maimone, Wilmington, DE (US)

(73) Assignee: FlexHandle, LLC

( * ) Notice: Subject to any disclaimer, the term of this patent is extended or adjusted under 35 U.S.C. 154(b) by 269 days.

(21) Appl. No.: 17/411,665

(22) Filed: Aug. 25, 2021

(65) Prior Publication Data

US 2021/0402630 A1 Dec. 30, 2021

Related U.S. Application Data

(60) Division of application No. 16/539,343, filed on Aug. 13, 2019, now Pat. No. 11,148,310, which is a continuation of application No. 15/626,300, filed on Jun. 19, 2017, now abandoned, which is a continuation-in-part of application No. 14/223,453, filed on Mar. 24, 2014, now abandoned.

(51) Int. Cl.
*B26B 21/52* (2006.01)
*B26B 21/22* (2006.01)

(52) U.S. Cl.
CPC .......... *B26B 21/521* (2013.01); *B26B 21/225* (2013.01); *B26B 21/523* (2013.01)

(58) Field of Classification Search
CPC ...... B26B 21/52; B26B 21/521; B26B 21/523
USPC ................................ 30/526–535; D28/44–48
See application file for complete search history.

(56) References Cited

U.S. PATENT DOCUMENTS

| | | | | | |
|---|---|---|---|---|---|
| D9,882 | S | | 4/1877 | Widmayer. | |
| 480,976 | A | | 8/1892 | Sutphen. | |
| 731,338 | A | | 6/1903 | Cattelle | |
| 1,227,641 | A | | 5/1917 | Maszczyk | |
| 1,332,591 | A | | 3/1920 | Kemp | |
| 1,423,414 | A | | 7/1922 | Glaser | |
| 1,455,726 | A | * | 5/1923 | Hartman | B26B 21/52 30/529 |
| 1,455,751 | A | * | 5/1923 | Hartman | B26B 21/52 30/529 |
| 1,552,234 | A | * | 9/1925 | Roebuck | B26B 21/52 30/529 |
| 1,553,796 | A | | 9/1925 | Anderson | |
| 1,639,441 | A | * | 8/1927 | Spahr | B26B 21/52 30/529 |

(Continued)

FOREIGN PATENT DOCUMENTS

| | | |
|---|---|---|
| CA | 2493824 A1 | 7/2005 |
| CA | 2717671 A1 | 4/2012 |

(Continued)

*Primary Examiner* — Jason Daniel Prone
(74) *Attorney, Agent, or Firm* — Faegre Drinker Biddle & Reath LLP

(57) ABSTRACT

A razor has a handle with an articulable joint intermediate the cutting blade and the portion of the handle grasped by a user. The joint connects first and second portions of the handle. A spring is mounted around the tail of a plunger between the portions. The spring projects into a spring channel in the second portion and urges the portions to an initial non-use position.

20 Claims, 11 Drawing Sheets

(56) References Cited

U.S. PATENT DOCUMENTS

| | | | | | |
|---|---|---|---|---|---|
| 1,719,675 | A | * | 7/1929 | Sirch | B26B 21/30 30/526 |
| 1,933,186 | A | | 10/1933 | Ryley | |
| 1,945,117 | A | * | 1/1934 | Mann | B26B 21/52 30/531 |
| 2,023,564 | A | * | 12/1935 | Winn | B26B 21/52 30/529 |
| 2,028,011 | A | | 1/1936 | Raymond | |
| 2,083,172 | A | | 6/1937 | Smith | |
| 2,132,293 | A | | 10/1938 | Harrer | |
| 2,162,388 | A | * | 6/1939 | Rockwell | B26B 21/52 30/531 |
| 2,229,666 | A | | 1/1941 | Monnet | |
| 2,370,815 | A | | 3/1945 | Ross | |
| 2,497,266 | A | | 2/1950 | Levane | |
| 2,600,318 | A | | 6/1952 | Patrignani | |
| 2,678,490 | A | | 5/1954 | Winslow | |
| 2,744,317 | A | | 5/1956 | Borden | |
| 2,748,468 | A | | 6/1956 | Testi | |
| 2,748,470 | A | | 6/1956 | Borden | |
| 2,780,866 | A | | 2/1957 | Borden | |
| 2,810,953 | A | | 10/1957 | Brody | |
| 2,844,870 | A | | 7/1958 | Roces et al. | |
| 2,980,457 | A | | 4/1961 | Page | |
| 3,317,995 | A | | 5/1967 | Bord | |
| 3,460,190 | A | | 8/1969 | Macdonald | |
| 3,745,921 | A | | 7/1973 | Mac et al. | |
| 3,823,471 | A | | 7/1974 | Stone | |
| 3,935,639 | A | * | 2/1976 | Terry | B26B 21/225 30/532 |
| 4,083,104 | A | * | 4/1978 | Nissen | B26B 21/521 30/532 |
| 4,168,571 | A | * | 9/1979 | Francis | B26B 21/22 30/50 |
| 4,253,235 | A | * | 3/1981 | Jacobson | B26B 21/521 30/533 |
| 4,253,236 | A | * | 3/1981 | Jacobson | B26B 21/521 30/47 |
| 4,253,237 | A | * | 3/1981 | Jacobson | B26B 21/521 30/530 |
| 4,258,471 | A | * | 3/1981 | Jacobson | B26B 21/521 30/532 |
| 4,461,078 | A | | 7/1984 | Carreker | |
| 4,488,357 | A | * | 12/1984 | Jacobson | B26B 21/225 30/527 |
| 4,548,446 | A | | 10/1985 | Warshawsky | |
| D293,876 | S | | 1/1988 | Thomson | |
| 4,879,811 | A | | 11/1989 | Cooney | |
| 4,955,136 | A | | 9/1990 | Diaz-Rivera | |
| 5,031,319 | A | | 7/1991 | Althaus et al. | |
| 5,033,152 | A | | 7/1991 | Althaus | |
| 5,038,472 | A | | 8/1991 | Iderosa | |
| 5,050,301 | A | * | 9/1991 | Apprille, Jr. | B26B 21/521 30/529 |
| 5,054,154 | A | | 10/1991 | Schiffer et al. | |
| D322,144 | S | | 12/1991 | Schneider | |
| 5,167,069 | A | | 12/1992 | Quinn | |
| 5,182,858 | A | * | 2/1993 | Chen | B26B 21/521 30/530 |
| 5,402,574 | A | | 4/1995 | Milner | |
| 5,560,106 | A | | 10/1996 | Armbruster et al. | |
| 5,600,887 | A | | 2/1997 | Olson | |
| 5,678,316 | A | | 10/1997 | Althaus et al. | |
| 5,771,591 | A | | 6/1998 | Armbruster et al. | |
| 5,855,071 | A | | 1/1999 | Apprille et al. | |
| 6,052,905 | A | | 4/2000 | Branchinelli et al. | |
| 6,073,299 | A | | 6/2000 | Hohlbein | |
| 6,189,222 | B1 | | 2/2001 | Doyle | |
| 6,223,442 | B1 | | 5/2001 | Pina | |
| 6,266,888 | B1 | | 7/2001 | Zowaski | |
| 6,308,416 | B1 | | 10/2001 | Bosy et al. | |
| 6,473,971 | B2 | | 11/2002 | Ordaz | |
| 6,568,082 | B2 | | 5/2003 | Pouettre et al. | |
| 6,584,696 | B2 | | 7/2003 | Ferraro | |
| 6,598,303 | B2 | | 7/2003 | Bosy et al. | |
| 6,886,262 | B2 | | 5/2005 | Ohtsubo et al. | |
| D507,379 | S | | 7/2005 | Alphonso | |
| D512,795 | S | | 12/2005 | Carpenter | |
| 6,973,730 | B2 | | 12/2005 | Tomassetti et al. | |
| 7,000,282 | B2 | | 2/2006 | Cox et al. | |
| 7,007,390 | B2 | | 3/2006 | Mislove | |
| 7,028,405 | B2 | | 4/2006 | Paas et al. | |
| 7,059,018 | B2 | | 6/2006 | Koshikawa et al. | |
| 7,093,363 | B1 | * | 8/2006 | Kuo | B26B 21/521 30/535 |
| 7,096,536 | B2 | | 8/2006 | Johnson | |
| 7,100,284 | B2 | | 9/2006 | King | |
| 7,137,205 | B2 | | 11/2006 | Royle | |
| 7,210,199 | B2 | | 5/2007 | Clark | |
| D560,032 | S | | 1/2008 | Lopez | |
| 7,469,446 | B1 | | 12/2008 | Brown et al. | |
| 7,566,089 | B2 | | 7/2009 | Alfaro | |
| D603,096 | S | | 10/2009 | Greene | |
| D605,362 | S | | 12/2009 | Andersen | |
| D611,653 | S | | 3/2010 | Marut | |
| 7,726,032 | B1 | | 6/2010 | Hernandez | |
| D622,576 | S | | 8/2010 | Farkas et al. | |
| D623,800 | S | | 9/2010 | Clemons | |
| 7,856,725 | B2 | | 12/2010 | Marut | |
| 7,874,076 | B2 | | 1/2011 | Gratsias et al. | |
| 7,934,320 | B2 | | 5/2011 | Gratsias et al. | |
| 8,006,393 | B2 | | 8/2011 | Collins | |
| 8,096,054 | B2 | | 1/2012 | Denkert et al. | |
| D659,904 | S | | 5/2012 | Gilbert | |
| 8,205,344 | B2 | | 6/2012 | Stevens | |
| D664,297 | S | | 7/2012 | Prat-Pfister | |
| 8,209,816 | B2 | | 7/2012 | Heger et al. | |
| D676,197 | S | | 2/2013 | Boulanger | |
| 8,366,179 | B2 | | 2/2013 | Houser et al. | |
| 8,555,949 | B2 | | 10/2013 | Mortier | |
| 8,591,348 | B2 | | 11/2013 | Brown et al. | |
| 8,607,458 | B2 | | 12/2013 | Hosseini et al. | |
| 8,640,342 | B2 | | 2/2014 | Murgida | |
| 8,745,882 | B2 | * | 6/2014 | Murgida | B26B 21/521 30/527 |
| 8,819,897 | B2 | | 9/2014 | Nuckolls et al. | |
| 8,833,486 | B2 | | 9/2014 | Krauter et al. | |
| 9,016,773 | B2 | | 4/2015 | Tanner et al. | |
| 9,327,415 | B1 | * | 5/2016 | Hovsepian | B26B 21/521 |
| 9,731,426 | B2 | * | 8/2017 | Kim | B26B 21/225 |
| 9,873,206 | B2 | | 1/2018 | Gulledge | |
| 9,902,077 | B2 | * | 2/2018 | Park | B26B 21/521 |
| 9,993,931 | B1 | * | 6/2018 | Zucker | B26B 21/521 |
| 10,406,704 | B2 | * | 9/2019 | Barrett | B26B 21/521 |
| 10,843,357 | B2 | * | 11/2020 | Jang | B26B 21/225 |
| 10,974,403 | B2 | * | 4/2021 | Chang | B26B 21/521 |
| 11,148,310 | B2 | * | 10/2021 | Maimone | B26B 21/521 |
| 11,325,273 | B1 | * | 5/2022 | Insana | B26B 21/225 |
| 11,413,777 | B2 | * | 8/2022 | Brellis | B26B 21/52 |
| 11,518,055 | B2 | * | 12/2022 | Chang | B26B 21/521 |
| 11,648,700 | B2 | * | 5/2023 | Paspatis | B26B 21/52 30/526 |

| | | | |
|---|---|---|---|
| 2002/0083600 | A1 | 7/2002 | Donovan |
| 2003/0177648 | A1 | 9/2003 | Zeiter |
| 2004/0093689 | A1 | 5/2004 | Sosa et al. |
| 2004/0107585 | A1 | 6/2004 | Helmrich |
| 2004/0177518 | A1 | 9/2004 | Leventhal |
| 2004/0177519 | A1 | 9/2004 | Tomassetti et al. |
| 2006/0101655 | A1 | 5/2006 | Givant |
| 2006/0293096 | A1 | 12/2006 | Kakuguchi et al. |
| 2007/0000090 | A1 | 1/2007 | Wu |
| 2007/0251057 | A1 | 11/2007 | Lautenschlager |
| 2009/0151118 | A1 | 6/2009 | Karkkola et al. |
| 2010/0005669 | A1 | 1/2010 | Winter et al. |
| 2010/0175270 | A1 | 7/2010 | Psimadas et al. |
| 2010/0287784 | A1 | 11/2010 | Qiu |
| 2011/0088269 | A1 | 4/2011 | Walker et al. |
| 2011/0271534 | A1 | 11/2011 | Briganti |
| 2012/0110855 | A1 | 5/2012 | Allen, Sr. |
| 2012/0324664 | A1 | 12/2012 | Carpenter |
| 2013/0160305 | A1 | 6/2013 | Howell et al. |
| 2013/0298407 | A1 | 11/2013 | Ramirez |
| 2013/0298412 | A1 | 11/2013 | Harski |

(56) References Cited

U.S. PATENT DOCUMENTS

| | | | |
|---|---|---|---|
| 2014/0123506 A1 | 5/2014 | Gaines | |
| 2014/0259532 A1 | 9/2014 | Millard et al. | |
| 2014/0290075 A1 | 10/2014 | Takayanagi et al. | |
| 2015/0266191 A1 | 9/2015 | Maimone et al. | |
| 2016/0031102 A1 | 2/2016 | Sacks et al. | |
| 2016/0107324 A1 | 4/2016 | Robertson et al. | |
| 2016/0151925 A1 | 6/2016 | Gers-Barlag et al. | |
| 2016/0263757 A1* | 9/2016 | Vandervelde | B26B 21/521 |
| 2017/0282392 A1 | 10/2017 | Maimone et al. | |
| 2019/0152077 A1 | 5/2019 | Kim | |
| 2019/0176355 A1 | 6/2019 | Mazarakis et al. | |
| 2020/0338768 A1 | 10/2020 | Dixon | |

FOREIGN PATENT DOCUMENTS

| | | | | |
|---|---|---|---|---|
| CH | 419895 A | 8/1966 | | |
| DE | 3635552 A1 | 4/1988 | | |
| DE | 9207001 U1 | 8/1992 | | |
| DE | 19508873 A1 | 2/1996 | | |
| DE | 29621890 U1 | 3/1997 | | |
| DE | 202006013187 U1 | 11/2006 | | |
| DE | 202012002692 U1 | 3/2013 | | |
| EP | 0429174 A2 | 5/1991 | | |
| EP | 1674220 A1 | 6/2006 | | |
| FR | 1042130 A | 10/1953 | | |
| FR | 1060848 A | 4/1954 | | |
| FR | 1141366 A | 9/1957 | | |
| FR | 2829716 A1 | 3/2003 | | |
| GB | 0210148 A | 1/1924 | | |
| GB | 0316002 A | 7/1929 | | |
| KR | 200472977 Y1 | * | 6/2014 | B26B 21/521 |
| WO | 89/10245 A1 | 11/1989 | | |
| WO | 2009/017476 A1 | 2/2009 | | |
| WO | WO-2021076116 A1 | * | 4/2021 | B26B 21/521 |

* cited by examiner

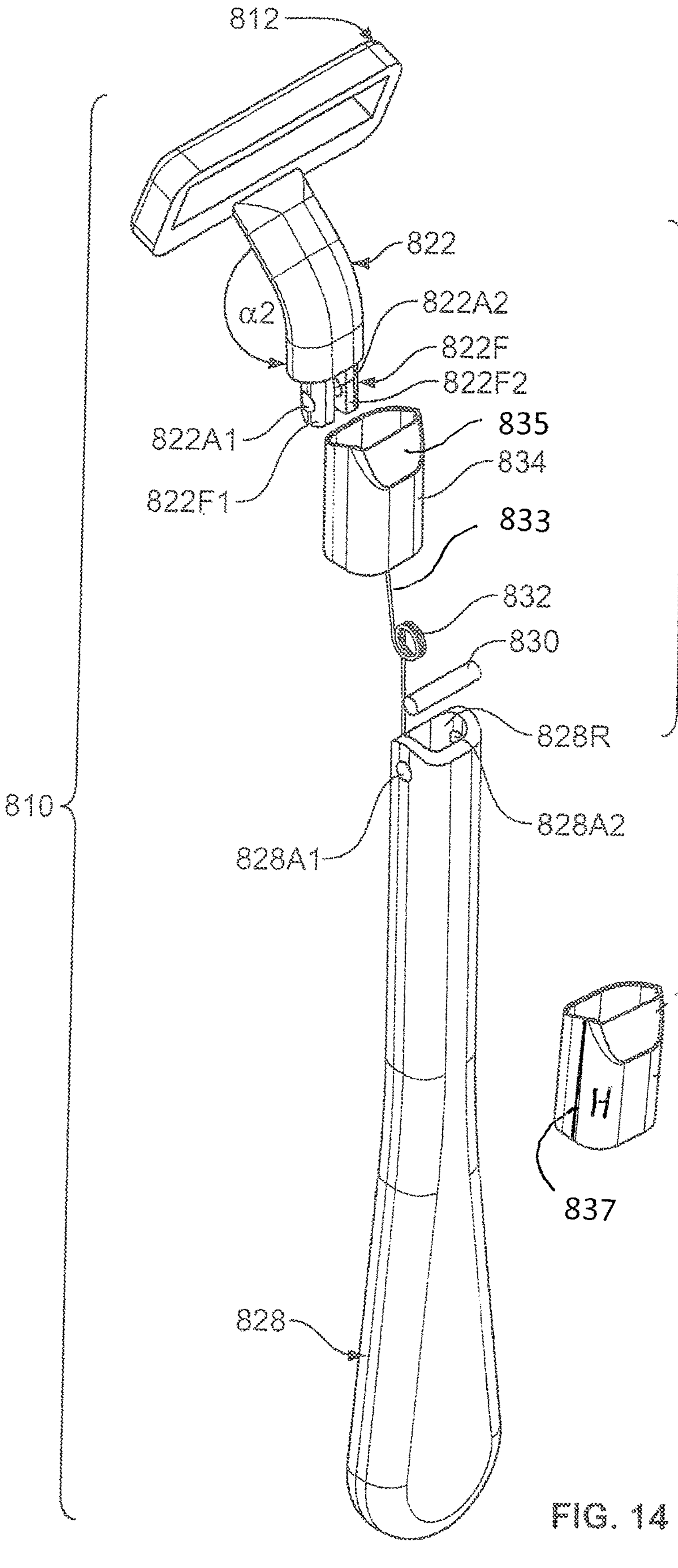
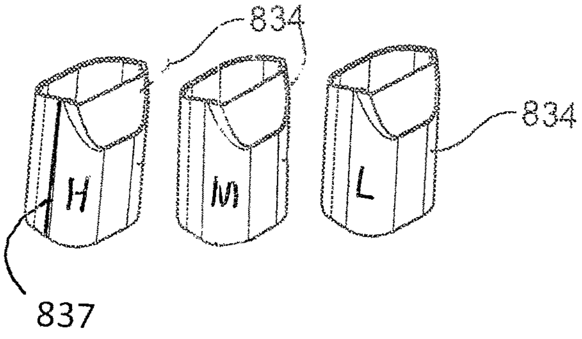
FIG. 14 A
FIG. 14

RAZOR WITH HANDLE HAVING ARTICULABLE JOINT

CROSS-REFERENCE TO RELATED APPLICATION

This application is a division of U.S. Ser. No. 16/539,343, now U.S. Pat. No. 11,148,310, filed Aug. 13, 2019, which is a continuation-in-part of U.S. Ser. No. 15/626,300, filed Jun. 19, 2017, which is a continuation-in-part of U.S. Ser. No. 14/223,453, filed Mar. 24, 2014, all of which are incorporated herein by reference in their entirety.

FIELD

The present invention relates to personal care utensils, and more particularly, to skin care utensils, such as razors for shaving hair from skin surfaces on the body.

BACKGROUND

Various known skin care utensils have handles that support a head portion at one end and are adapted to be grasped and manipulated by the hand of a user to manipulate and direct the head portion. Razors are known as having handles that attach to head portions that retain a razor blade therein that may be dragged over a skin surface, such as the face or legs, to cut hair extending from the skin surface. Notwithstanding known designs for personal care utensils, improved and/or alternative designs remain desirable.

SUMMARY

The disclosed subject matter relates to a razor handle for use with a razor having a head with at least one blade. The handle has an upper portion capable of connecting to the head and a lower portion capable of being grasped by a hand of a user. The handle has a joint capable of being connected at one end to the upper portion and capable of being connected at the other end to the lower portion. The joint is capable of flexing when subjected to force.

In another embodiment, the joint is made from an elastomeric material.

In another embodiment, the upper portion and the lower portion are made of one material and the joint is made from a different material.

In another embodiment, the joint is attached to the upper portion and the lower portion by an adhesive.

In another embodiment, the joint is removably attached to the upper portion and the lower portion by mechanical engagement.

In another embodiment, the joint is attached to the upper portion and the lower portion by plastic welding.

In another embodiment, the joint is attached to the upper portion and the lower portion by over-molding.

In another embodiment, the joint has an articulable pivot.

In another embodiment, the articulable pivot includes a pin extending through a pivot aperture in the upper portion and a pivot aperture in the lower portion, coupling the upper portion and the lower portion together at the articulable pivot.

In another embodiment, further including a resilient member, the resilient member capable of urging the joint to an initial position, the joint capable of being displaced to a displaced position and returning to the initial position under the influence of the resilient member.

In another embodiment, the resilient member is a spiral spring with a first arm acting against the upper portion and a second arm acting against the lower portion, the pin extending through a coil portion of the spiral spring.

In another embodiment, one of the upper portion and the lower portion has a forked end with two tines, the tines each having a depression in an interior surface thereof, and the other of the lower portion and the upper portion has a pair of projections capable of being matingly received in the depressions to define the articulable pivot.

In another embodiment, further including a cam element and a resilient element and wherein one of the upper portion and the lower portion has a channel therein capable of receiving the cam element and the resilient element therein, the resilient element capable of urging the cam element in a direction out of the channel and into contact with the other of the lower portion and the upper portion.

In another embodiment, the resilient element is a coil spring with an axial hollow and the cam element has a tail capable of being received in the axial hollow to retain the cam element oriented with the spring.

In another embodiment, the joint has at least one undercut into the surface thereof.

In another embodiment, the joint has a smooth outer surface.

In another embodiment, the joint is monolithically formed with at least one of the upper portion and the lower portion.

In another embodiment, the joint is monolithically formed with both the upper portion and the lower portion.

In another embodiment, the handle is angled at the joint.

In another embodiment, the upper portion is angled intermediate the joint and the head.

In another embodiment, the angle formed by the angled joint is in a range of 95 to 175 degrees.

In another embodiment, the angle formed by the angled upper portion is in a range of 95 to 175 degrees.

In another embodiment, the handle is curved.

In another embodiment, the handle is non-removably connected to the head.

In another embodiment, a razor has a head capable of containing at least one blade and a handle capable of connecting to the head and being grasped by a hand of a user. The handle has an upper portion proximate the head, a lower portion distal to the head and a joint intermediate the upper portion and the lower portion. The joint is capable of flexing when subjected to force.

In another embodiment, the head is formed monolithically with the handle.

In another embodiment, the head is coupled to the upper portion distal to the joint by a pivot joint.

In another embodiment, indicium on the joint indicates its rigidity.

In another embodiment, the joint is selectable to provide a desired rigidity.

In another embodiment, a flexible sleeve is disposed about the pivot joint.

In another embodiment, a razor has a head containing at least one blade and a handle connected to the head and capable of being grasped by a hand of a user. The handle has an upper portion proximate the head and a lower portion distal to the head. A joint is interposed and connected to the upper portion and the lower portion and is capable of flexing when subjected to force.

BRIEF DESCRIPTION OF THE DRAWINGS

For a more complete understanding of the present disclosure, reference is made to the following detailed description of exemplary embodiments considered in conjunction with the accompanying drawings.

FIG. 14 is an exploded view of a razor in accordance with an alternative embodiment of the present disclosure.

FIG. 14A shows a set of sleeves in accordance with this invention.

DETAILED DESCRIPTION OF EXEMPLARY EMBODIMENTS

Figure 1A:
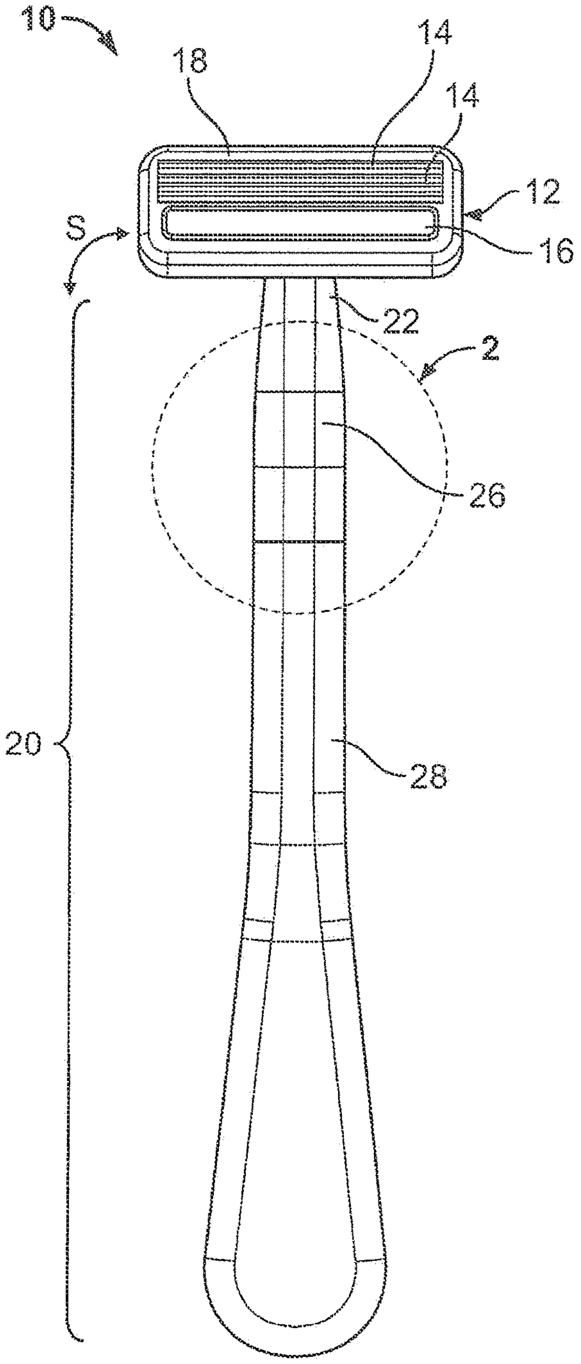
FIGS. 1A and 1B are front and side views, respectively, of a razor in accordance with an embodiment of the present disclosure.

Personal care utensils that come into contact with the human body, e.g., the skin surface, must be used with care to avoid injury. Such utensils are used frequently, e.g., daily, for a substantial period of time. The foregoing is true of shaving devices, especially those having a sharp razor blade that is passed close to the skin surface to cut hair protruding through the surface of the skin. Due to the sharpness of the blade and the complexity of the shape of the skin surface, e.g., as encountered on a leg or face, it is challenging to hold and dynamically re-position the razor to get a close shave without inadvertently cutting the skin. In shaving with a razor, the blade must be held at a suitable angle relative to the skin surface and pulled across the skin at that angle to cut the hair. The optimal angle of the razor relative to the skin is preferably maintained as the entire surface of the skin is shaved. When the skin surface changes its angular orientation in space, e.g., following the contours of a leg, face or neck, the razor blade must be repositioned in space, e.g., by the person who is shaving changing the angle of the razor blade by changing the angle of the handle. This change of handle angle is typically executed by changing the relative orientation of the handle relative to the fingers, hand, wrist, elbow and arm of the person shaving, as well as changing the position of the skin, e.g., by tilting the head, moving the leg or jutting out the jaw. In addition to the razor angle, there is an optimal down pressure which holds the razor against the skin surface to allow the razor to effectively cut the hair to be shaved. As a result, the person shaving must try to maintain an even, optimal down-pressure while at the same time maintaining an optimal razor angle over a changing surface. The surface to be shaved may have different orientations, e.g., the two sides of the face, requiring repositioning of the handle, fingers, wrist, hand, etc. While the human being is remarkably dexterous and can conduct these tasks with their dominant hand, shaving can result in nicks, cuts, and irritation, can be fatiguing, and may not result in an effective shave. Each person also has a limited range of motion and strength of the wrist, elbow, arm and fingers and that range and strength significantly may be reduced for a person having a condition like arthritis. In addition to the foregoing considerations, shaving may be done by a person shaving another, e.g., in the case of a barber, a health care provider, or a veterinarian.

An aspect of the present disclosure is the recognition that a handle having a resilient articulated joint may be utilized to intermediate between a non-articulated handle portion and a head portion, e.g., a razor head that holds a razor blade for shaving. Further, the articulable joint may be resiliently biased to an initial, unloaded or start position and be articulable through a range of motion to a variety of displaced positions in response to force exerted by the user on the non-articulable portion of the handle and the counter, responsive force exerted by the skin surface on the head of the razor, as the head is pressed against the skin. Upon unloading the bending force, the articulable joint may resiliently return to the initial position. The articulable joint gives rise to a new dynamic for controlling the razor angle relative to the skin as well as the magnitude of pressure that the razor is pressed against the skin. As shown in the present disclosure, the articulable joint can be executed in a variety of materials and mechanisms and may be utilized in conjunction with a razor head pivotally connected to the handle proximate the end thereof beyond the articulable joint or with a razor head that is rigidly attached to the end of the handle. The articulable joint may be incorporated into handles having a variety of shapes including shapes that are presently used for conventional razors. For example, the articulable joint may be incorporated into razor handles that are straight or curved.

Figure 1B:
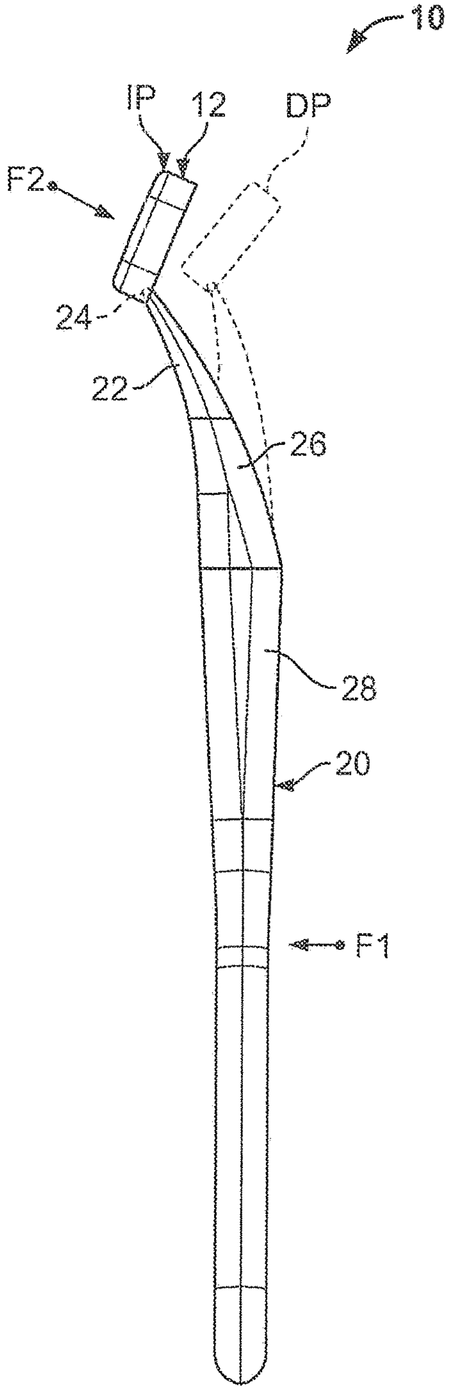

FIGS. 1A and 1B show a razor 10 having a head 12 that is adapted to hold one or more razor blades 14, which may be molded into the head 12 or otherwise held in a conventional manner. A pad 16 and/or the edge 18 may be utilized as reference surfaces for positioning and maintaining the razor blade(s) 14 at a given angle relative to the skin of a user (not shown). The head 12 shown is of the modern, multi-blade type razor head, but other types of razor heads, including, razor heads for the older double-edge or single-edge safety razors could be used. The head 12 is attached to a handle 20, either by a rigid monolithic molding to an upper portion 22 or may be mechanically coupled/uncoupled to the upper portion via a mechanism, latch system, or slide system commonly used on modern razors to allow for replacement of the head 12 on a handle 20. In a further alternative, the head 12 may be connected to the upper portion 22, e.g., by a pivot pin 24 inserted through or monolithically formed on the handle 22 or the head 12. The pivotal connection of the head 12 and upper portion 22 optionally may be capable of assembly to allow replacing the head 12 with another head. An articulable joint 26 couples to the upper portion 22 at one end distal to the head 12 and to a lower portion 28 at the other end. The articulable joint 26 may be formed from an elastomer or other compliant, resilient material, such as rubber, plastic, silicone rubber, or other natural or synthetic flexible material that has elasticity and elastic memory permitting deformation from and return to an initial position. The rigidity of the material of the articulable joint 26 may be selected based upon cost and to provide a given desired rigidity in accordance with consumer preferences. A variety of rigidities may be provided to allow a consumer to choose one that suits them best. The joint 26 may be marked or color coded to identify a given level of rigidity. The joint 26 may be coupled to the upper and lower portions 22, 28 of the handle 20 by co-molding, sequential injection molding, adhesives applied at the interface between the joint 26 and the upper and lower portions 22, 28, or by welding, e.g., thermo-plastic or ultra-sonic welding, depending upon the respective materials used for the handle portions 22, 28 and the joint 26.

The dimensions of the joint 26 also impact the structural rigidity thereof in response to forces, e.g., applied along vectors F1 and F2, which would be examples of a force applied by the fingers/hand of a user (F1) and the counter force (F2) applied by the surface of the skin. As can be appreciated from FIG. 1A, the front profile of the joint 26 displays a substantially constant width along the length thereof, limiting side-to-side movement in the direction of double-arrow line S. In contrast, the side view of the razor 10 of FIG. 1B shows that the joint 26 is significantly tapered from top to bottom and the reduced thickness attributable to the tapered shape, coupled with resilient material used to form the joint 26, will preferentially induce displacement from initial position IP to displaced position DP in response to force having a component along vector F2. In addition, the shape of the joint 26 may comply with or implement an aesthetic design. The razor 10, in side profile, is primarily straight, but has a slight curve in the handle 20 starting at the joint 26 and extending to the head 12.

Figure 2:
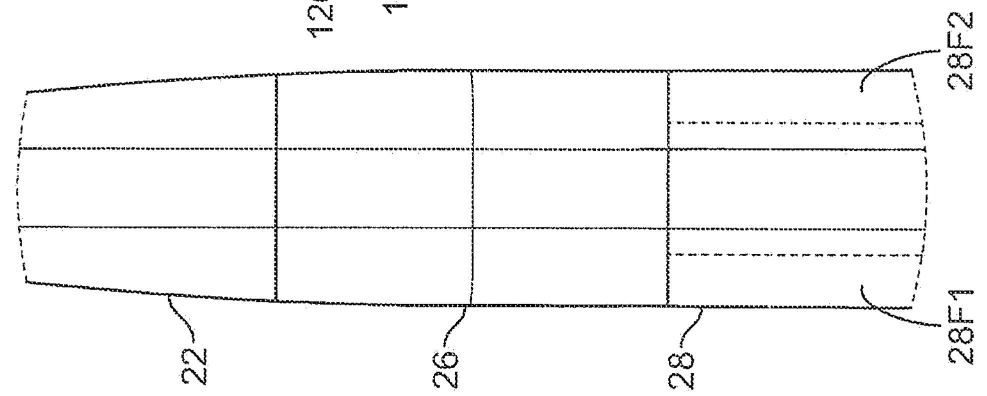
FIG. 2 is an enlarged view of a portion of the razor of FIGS. 1A and 1B.

FIG. 2 shows that the bottom portion 28 may feature a forked end with tines 28F1 and 28F2 to increase the surface area of contact with the joint 26, e.g., to distribute an adhesive or weld joint over a larger area and increase the strength of the connection between the joint 26 and the lower portion 28. The same approach may be utilized at the conjunction of the upper portion 22 and the joint 26 and the joint 26 may similarly be forked to increase connection strength to adjacent handle portions 22, 28.

Figure 3:
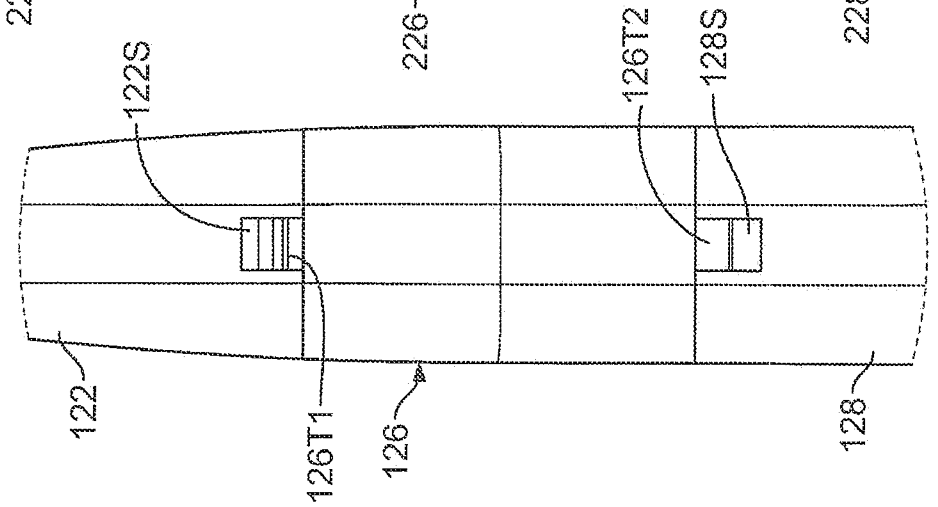
FIG. 3 is an enlarged view like FIG. 2, but of an alternative embodiment in accordance with the present disclosure.

FIG. 3 shows an alternative joint 126, similar to joint 26, but mechanically connected to an upper portion 122 and a lower portion 128. The joint 126 may feature tabs 126T1 and 126T2 that extend from the joint 126 and are received in and engage slots 122S, 128S. The tabs 126T1 and 126T2 may be formed from elastically resilient materials and have inwardly directed teeth that over-ride and then grip a ledge or depression formed in the base of the slots 122S, 128S. To disassemble the joint 126 from the upper portion 122 and lower portion 128, the edge of a fingernail or a knife may be introduced under the tabs 126T1, 126T2 to lift the tabs out of their engagement with the ledge or depression in the slots 122S, 128S. Joint 126 may be made of rubber, plastic, silicone rubber, or other natural or synthetic flexible material and may be marked or color coded to identify a given level of rigidity to provide a desired rigidity in accordance with consumer preferences and a range of rigidities may be provided to allow a consumer to choose one that suits them best.

Figure 4A:
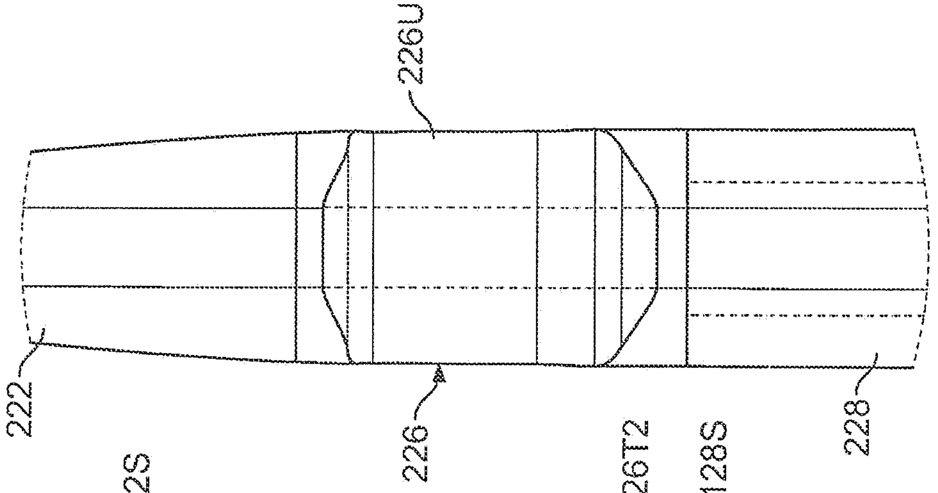
FIG. 4A is an enlarged view like FIG. 2, but of an alternative embodiment in accordance with the present disclosure.
Figure 4B:
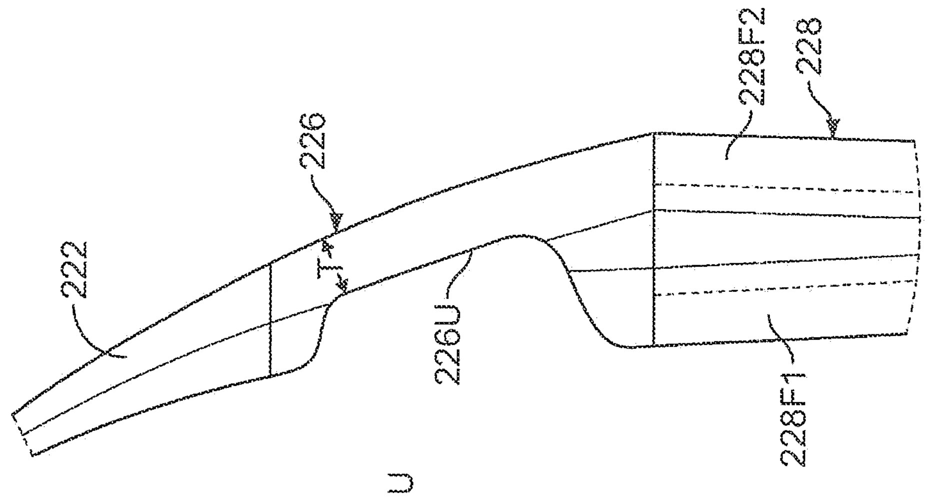
FIG. 4B is a side view of the portion of FIG. 4A.

FIGS. 4A and 4B show a joint 226 in accordance with another embodiment of the present disclosure wherein the joint 226 has a undercut 226U that reduces the front-to-back thickness T of the joint 226 thereby rendering the joint 226 more flexible to more readily assume a displaced position DP (see FIG. 1B), when loaded. As shown in FIG. 4B the undercut 226U is of smooth continuous shape at the front of the razor. As in FIG. 2, the lower portion 228 may be forked, having fork tines 228F1, 228F2. In FIG. 4B, the tines 228F1, 228F2 occupy front and back positions as compared to the side-to-side positions of the embodiment shown in FIG. 2, either approach being optional for either embodiment. As noted above with respect to FIG. 2, the same approach may be utilized at the conjunction of the upper portion 222 and the joint 226, and the joint 226 may similarly be forked to increase connection strength to adjacent handle portions 222, 228. In a further alternative, if the upper and lower portions of the handle 222, 228 are made from an elastomer or other compliant, resilient material, such as rubber, plastic, silicone rubber, or other natural or synthetic flexible material that has elasticity and elastic memory permitting deformation from and return to an initial position, the joint 226 may be made monolithically, the flexibility of the joint 226 being determined by the dimensions of the undercut 226U and thickness T.

Figure 5:
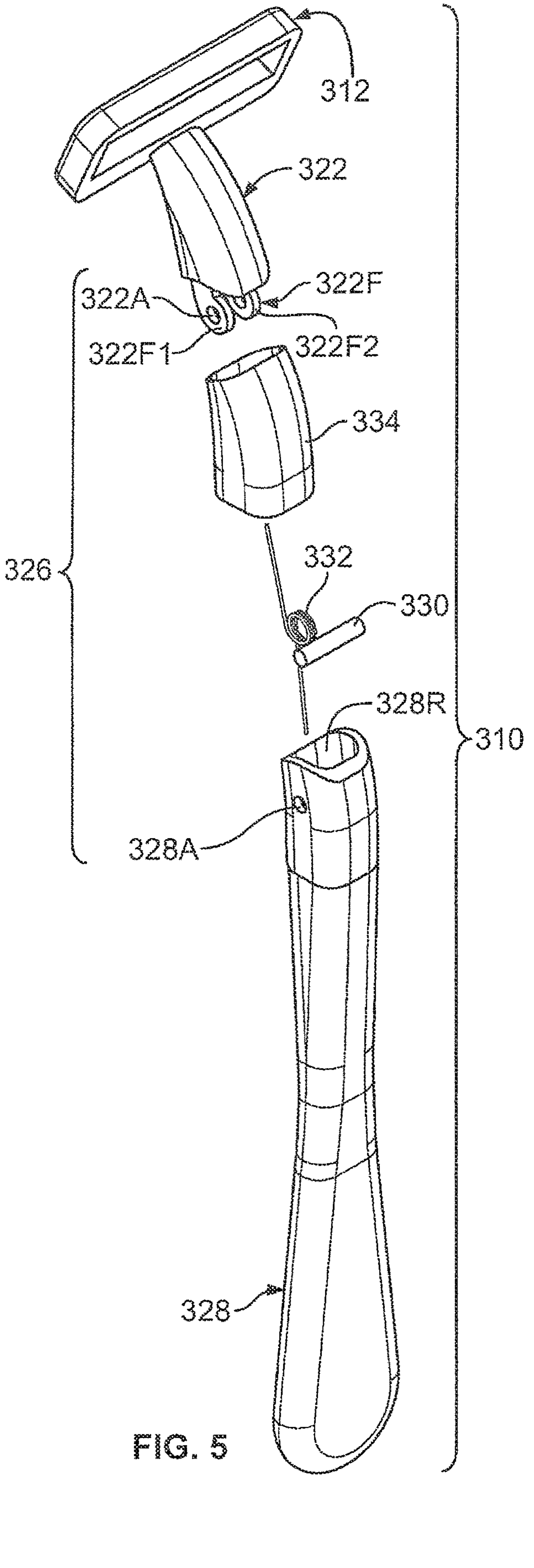
FIG. 5 is an exploded view of a razor in accordance with an alternative embodiment of the present disclosure.
Figure 6:
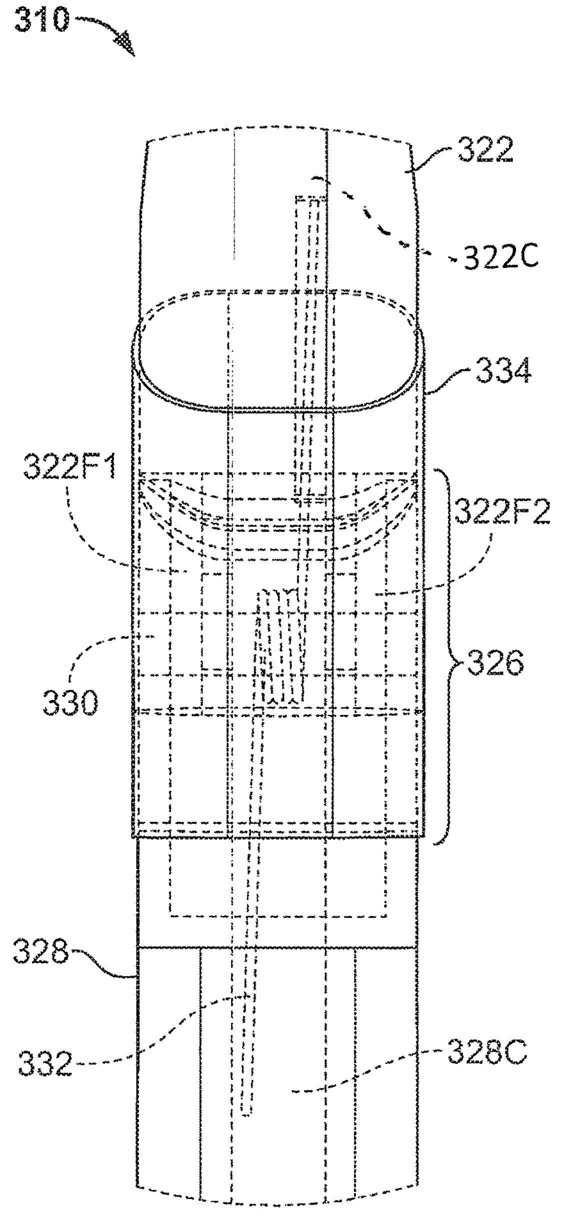
FIG. 6 is an enlarged, partially phantom view of a portion of the razor of FIG. 5.

FIGS. 5 and 6 show a razor 310 wherein an articulable joint 326 is defined by the pivotal connection of the first or upper portion 322 (having head 312) and second or lower portion 328 of the razor 310 by a pivot pin 330. The upper portion 322 has a forked extension 322F, with tines 322F1, 322F2 having apertures 322A to receive the pivot pin 330 there through. The lower portion 328 has a recess 328R into which the forked extension 322F may be inserted and which has apertures 328A, also capable of accommodating the pivot pin 330. A torsion spring 332 may be positioned coaxially about the pivot pin 330 and extend into cavities 322C and 328C in the upper and lower portions 322, 328 to resiliently bias the joint 326 to an initial position IP (See FIG. 1B). A flexible sleeve 334, e.g., made from an elastomer or other compliant, resilient material, such as rubber, plastic, silicone rubber, or other natural or synthetic flexible material, may be positioned over the assembled joint to retain the pivot pin 330, and to obscure the joint 326 for aesthetic reasons and/or to exclude contaminants, water, soap, etc. from the joint 326 and the interior hollows, e.g., 328R, 322C, 328C of the upper and lower portions 322, 328.

As shown in FIG. 6, sleeve 334 extends around the lower end of upper portion 322 and around the upper end of lower portion 328 completely covering the joint and is retained in position in complete surface to surface contact with the upper portion and the lower portion. FIGS. 5 and 6 also show that sleeve 334 is mounted to upper portion 322 and lower portion 328 without any external fastening elements. FIGS. 5 and 6 further illustrate sleeve 334 to have an outer surface throughout its length which is of a smooth and continuous and unbroken shape.

Figure 7:
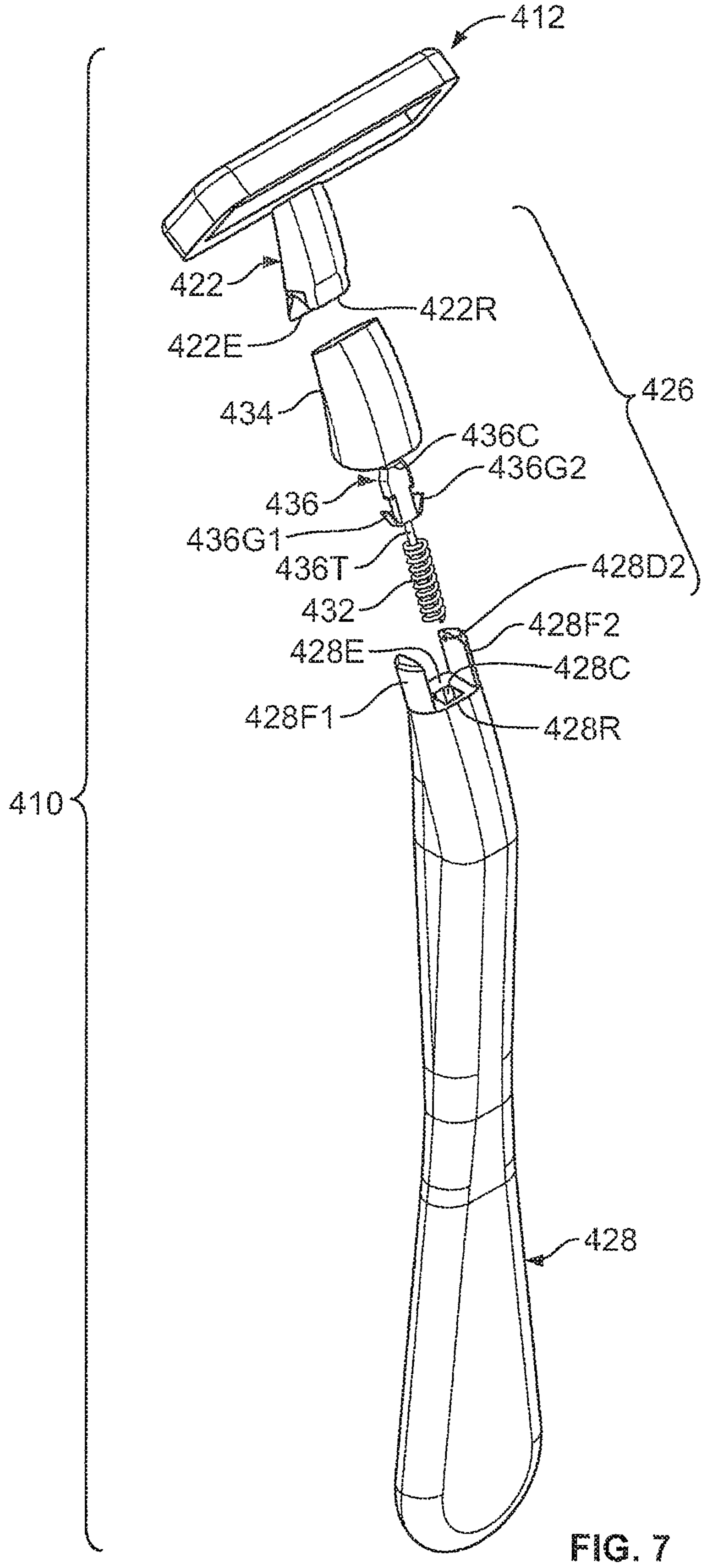
FIG. 7 is an exploded view of a razor in accordance with an alternative embodiment of the present disclosure.
Figure 9:
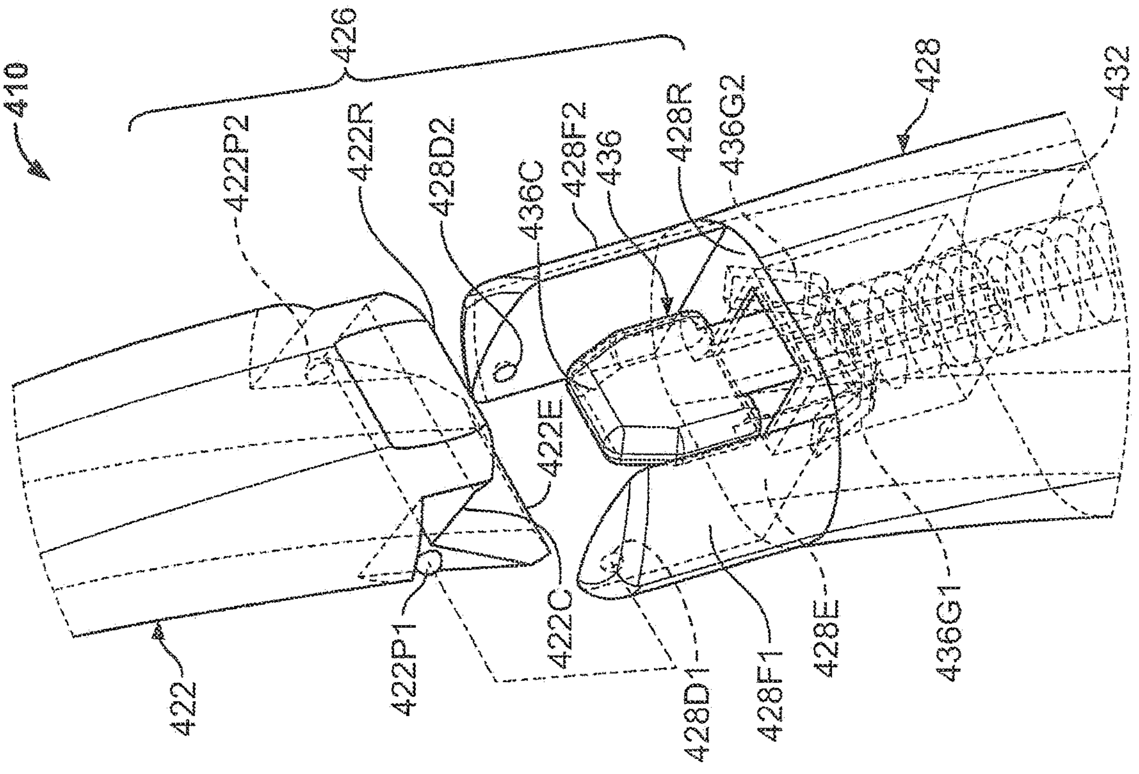
FIG. 9 is an enlarged, exploded, perspective view of a portion of the razor of FIGS. 7 and 8.
Figure 8:
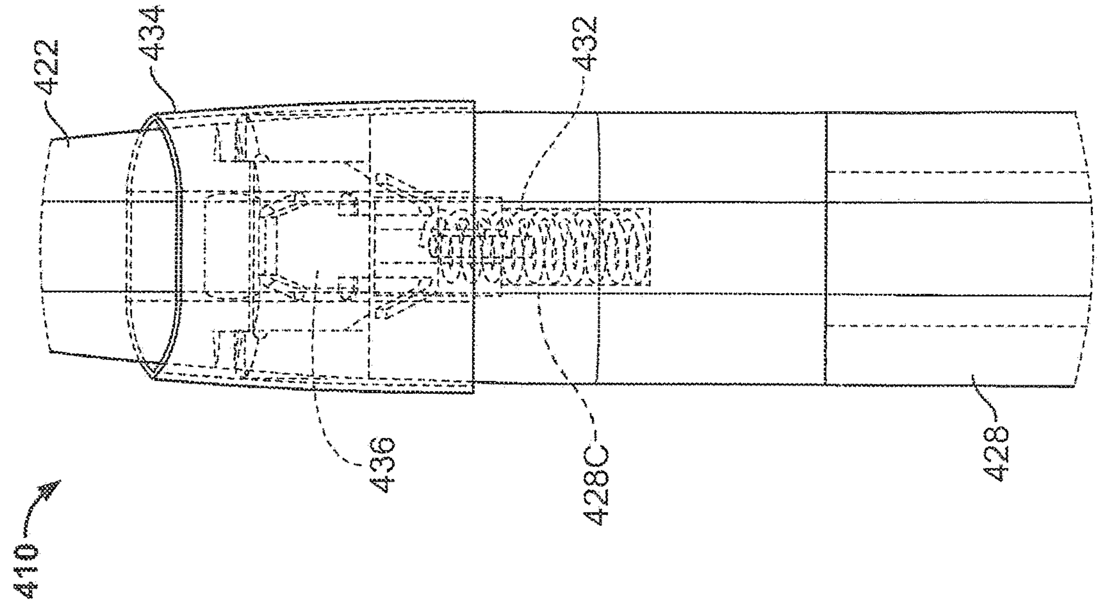
FIG. 8 is an enlarged, partially phantom view of a portion of the razor of FIG. 7.

FIGS. 7, 8 and 9 show a razor 410 in accordance with an alternative embodiment of the present disclosure. The joint 426 is defined by the pivotal connection of the upper portion 422 and lower portion 428 of the razor 410 by a pivot joint defined by opposed projections 422P1, 422P2 extending from opposed sides of upper portion 422, which are received in mating depressions 428D1, 428D2 provided on an inside surface of forks 428F1, 428F2. The lower portion 428 of the razor 410 is made from elastic materials such as rubber, plastic, silicone rubber, or other natural or synthetic flexible material, and, thus, the upper portion 422 may be snap-fitted to the bottom portion 428 by the outward bending of the forks 428F1, 428F2 to allow the projections 422P1, 422P2 to enter the depressions 428D1, 428D2 and then snap back to form a pivotal joint. The lower portion 428 has a spring channel 428C into which a coil spring 432 may be inserted to resiliently bias the joint 426 to an initial position IP (See FIG. 1B). A plunger 436 intermediates between the spring 432 and the upper portion 422. More particularly, the plunger 436 has an upper cam surface 436C that abuts against a cam surface 422C on the upper portion. The plunger 436 also features a tail portion 436T that extends into the internal hollow of the spiral spring 432 to keep the plunger 436 oriented with the axis of the spring 432. The plunger 436 has a pair of guides 436G1, 436G2 that extend from side surfaces of the plunger 436 and which can bend to enter and engage the spring channel 428C to stabilize and orient further the plunger 436 relative to the spring channel 428C. A flexible sleeve 434, e.g., made from an elastomer or other compliant, resilient material, such as rubber, plastic, silicone rubber, or other natural or synthetic flexible material, may be positioned over the assembled joint 426 to obscure the joint 426 for aesthetic reasons and/or to exclude contaminants, water soap, etc. from the joint 426 and the interior hollows, e.g., 428C, of the lower portion 428. The strength and length of the spring 432 may be selected to achieve a selected degree of preload that maintains the upper portion 422 at a given initial position IP (See FIG. 1B), the spring resiliently forcing the plunger 436 and the cam surface 436C thereof into contact with the cam surface 422C of the upper portion 422. When bending forces are encountered, e.g., F1, F2 shown in FIG. 1B, the head 412 and attached upper portion 422 are pivoted back on projections 422P1, 422P2 and depressions 428D1, 428D2, encountering the plunger 436 and compressing the spring 432. When the bending forces are removed, the razor 410 re-assumes the initial position IP. The movement of the joint 426 may be limited, e.g., between the initial position IP and a maximum displaced position by a mechanical stop. For example, the forward edge 422E may abut surface 428E in the initial position IP and the rear edge 422R may abut surface 428R in a maximally displaced position DP.

Figure 10A:
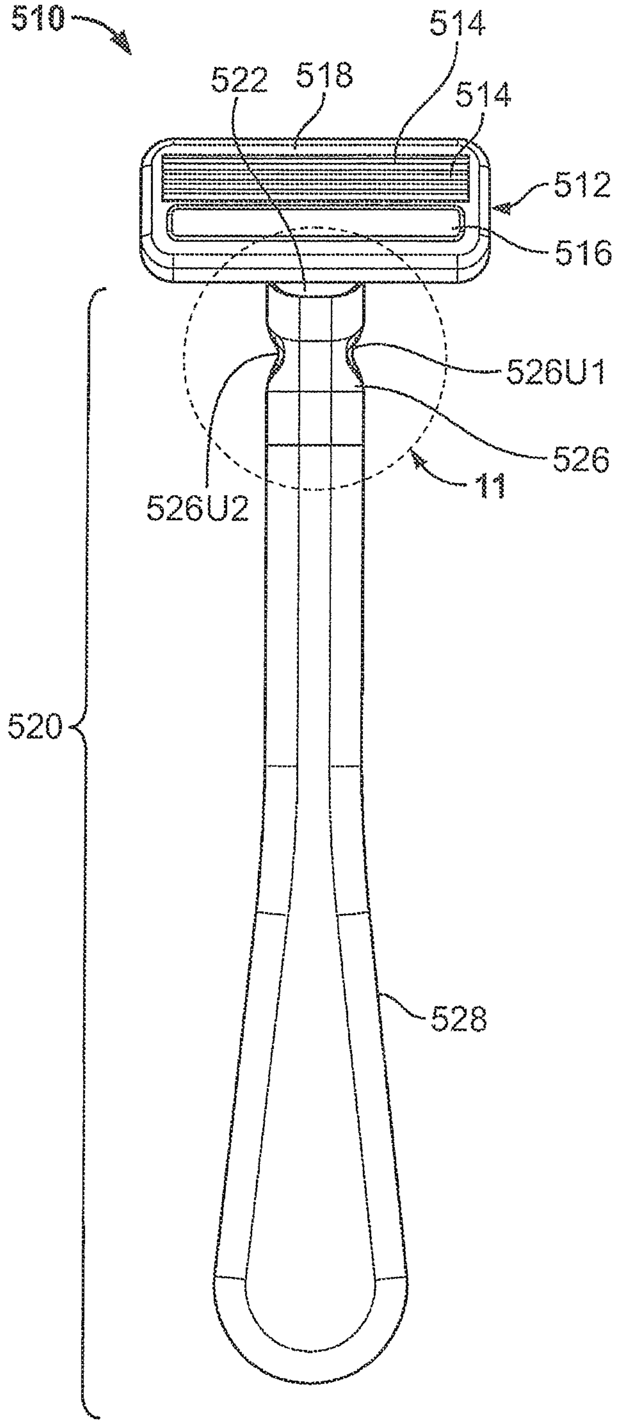
FIGS. 10A and 10B are front and side views, respectively, of a razor in accordance with an alternative embodiment of the present disclosure.
Figure 10B:
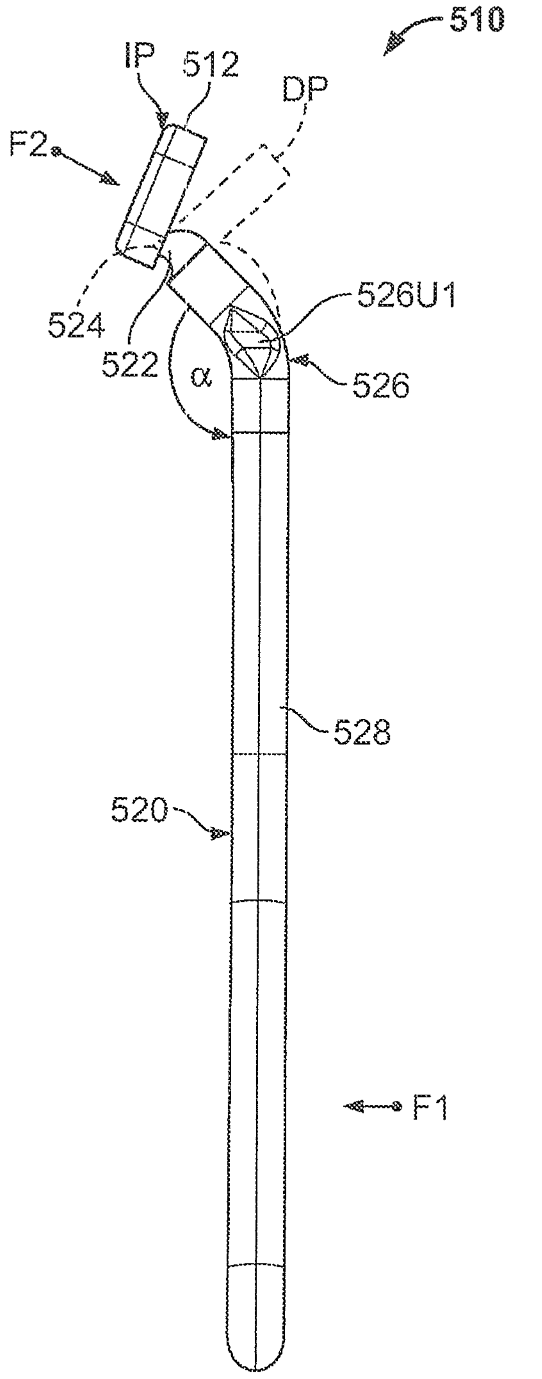

FIGS. 10A and 10B show a razor 510 having a head 512 that is adapted to hold one or more razor blades 514, which may be molded into the head 512 or otherwise held in a conventional manner, as in the embodiment depicted in FIGS. 1A and 1B. A pad 516 and/or the edge 518 may be utilized as reference surfaces for positioning and maintaining the razor blade(s) 514 at a given angle relative to the skin of a user (not shown). The head 512 shown is of the modern, multi-blade type razor head, but other types of razor heads, including, razor heads for the older double-edge or single-edge safety razors could be used. The head 512 is attached to a handle 520, either by a rigid monolithic molding to an upper portion 522 or may be mechanically coupled/uncoupled to the upper portion via a mechanism, latch system, or slide system commonly used on modern razors to allow for replacement of the head 512 on a handle 520. In a further alternative, the head 512 may be connected to the upper portion 522, e.g., by a pivot pin 524 inserted through or monolithically formed on the handle 522 or the head 512. The pivotal connection of the head 512 and upper portion 522 may be permanent or capable of disassembly to allow replacing the head 512 with another. An articulable joint 526 couples to the upper portion 522 at one end distal to the head 512 and to a lower portion 528 at the other end. The articulable joint 526 may be formed from an elastomer or other compliant, resilient material, such as rubber, plastic, silicone rubber, or other natural or synthetic flexible material that has elasticity and elastic memory permitting deformation from and return to an initial position. The rigidity of the material of the articulable joint 526 may be selected to provide a given desired rigidity, in accordance with consumer preferences and a range of rigidities may be provided to allow a consumer to choose one that suits them best. The joint 526 may be marked or color coded to identify a given level of rigidity. The joint 526 may be coupled to the upper and lower portions 522, 528 of the handle 520 by co-molding, sequential injection molding, adhesives applied at the interface between the joint 526 and the upper and lower portions 522, 528, or by welding, e.g., thermo-plastic or ultra-sonic welding, depending upon the respective materials used for the handle portions 522, 528 and the joint 526.

The dimensions of the joint 526 impact the structural rigidity thereof in response to forces, e.g., applied along vectors F1 and F2, which would be examples of a force applied by the fingers/hand of a user (F1) and the counter force (F2) applied by the surface of the skin. As can be appreciated from FIG. 10A, the front profile of the joint 526 reveals side undercuts 526U1, 526U2 that reduce the width of the joint and increase its flexibility. Razor 510 has a front where blades 514 are located, and has a back/rear with two intermediate sides. Each undercut 526U1 and 526U2 is located at a respective side, as illustrated in FIG. 10. The side view of the razor 510 of FIG. 10B shows that the undercuts 526U1, 526U2 have a complex shape that impacts the response of the joint 526 to force along vector F2 and the displacement from initial position IP to displaced position DP. As illustrated the complex shape differs from the smooth continuous shape of undercut 226U in FIG. 4B. Rather the complex shapes of undercuts 526U1 and 526U2, shown in FIGS. 10A and 10B, have multiple areas of different adjoining planes/curves. The depth, shape and placement of the undercuts 526U1, 526U2 may be used to provide a selected response, e.g., to provide a variety of joints 526 in a set of razors with a different stiffness to satisfy different users, which may include a handle 520 that is created by a single piece of molded plastic or similar material, or by multiple pieces of plastic or similar material that are molded, welded, or adhered together. In addition, the shape of the joint 526 may comply with or implement an aesthetic design. The razor 510, in side profile, has a lower portion that is primarily straight, an upper portion 522 that is straight and a joint 526 that executes a substantial angle $\alpha$ of approximately 95 to 175 degrees, in the initial position IP.

Although it is preferred in the embodiment of FIGS. 10-10A to have side undercuts, further flexibility may be achieved by having an additional undercut at the front and/or back of the joint. Such additional undercut(s) may be of complex shape or may be of smooth continuous shape.

Figure 11:
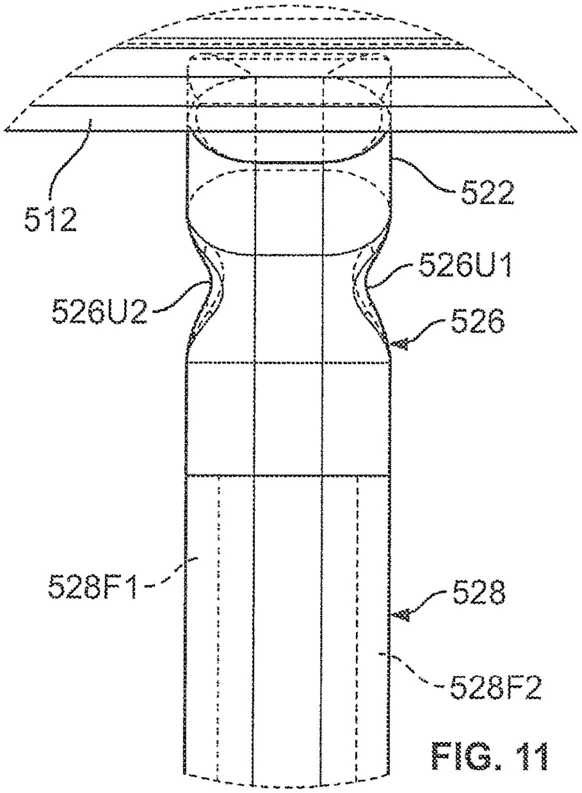
FIG. 11 is an enlarged view of a portion of the razor of FIGS. 10A and 10B.

FIG. 11 shows that the bottom portion 528 may feature a forked end with tines 528F1 and 528F2 to increase the surface area of contact, e.g., to distribute an adhesive or weld joint over a larger area and increase the strength of the connection between the joint 526 and the lower portion 528. The same approach may be utilized at the conjunction of the upper portion 522 and the joint 526 and the joint 526 may similarly be forked to increase connection to adjacent handle portions 522, 528. FIG. 11 illustrates the tines 528F1 and 528F2 to extend from the sides of joint 526, similar to tines 322F1 and 322F2 of FIG. 5. Alternatively, the tines could extend from the front and back of joint 526.

Figure 12:
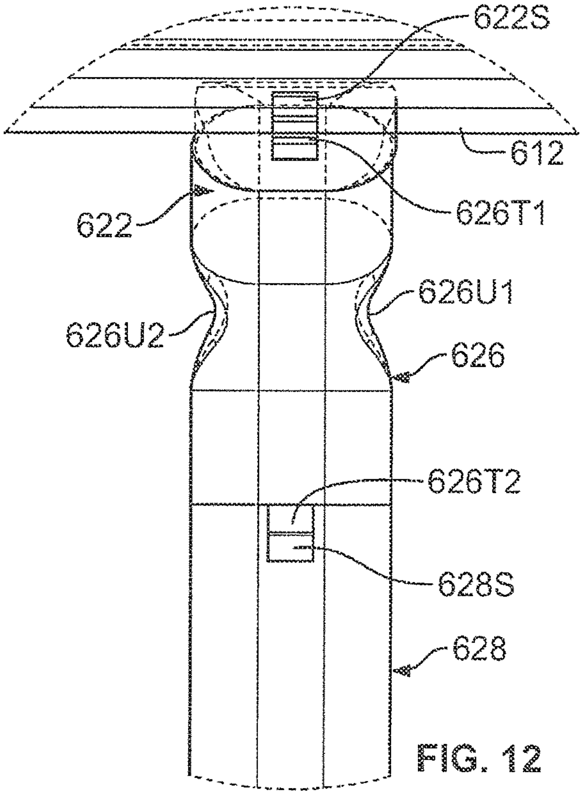
FIG. 12 is an enlarged view like FIG. 11, but of an alternative embodiment in accordance with the present disclosure.

FIG. 12 shows an alternative joint 626, similar to joint 526, but mechanically connected to an upper portion 622 and a lower portion 628. The joint 626 may feature tabs 626T1 and 626T2 that extend from the joint 626 and are received in and engage slots 622S, 628S. The tabs 626T1 and 626T2 may be formed from elastically resilient materials and have inwardly directed teeth that over-ride and then grip a ledge or depression formed in the base of the slots 622S, 628S. To disassemble the joint 626 from the upper portion 622 and lower portion 628, the edge of a fingernail or a knife may be introduced under the tabs 626T1, 626T2 to lift the tabs out of their engagement with the ledge or depression in the slots 622S, 628S. Joint 626 may be made of rubber, plastic, silicone rubber, or other natural or synthetic flexible material and may be marked or color coded to identify a given level of rigidity to provide a desired rigidity in accordance with consumer preferences and a range of rigidities may be provided to allow a consumer to choose one that suits them best.

Figure 13A:
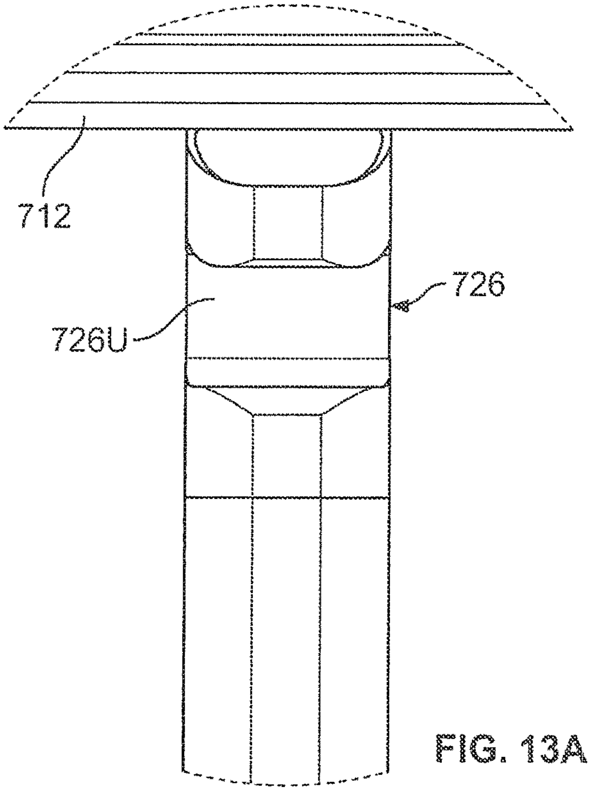
FIG. 13A is an enlarged view like FIG. 11, but of an alternative embodiment in accordance with the present disclosure.
Figure 13B:
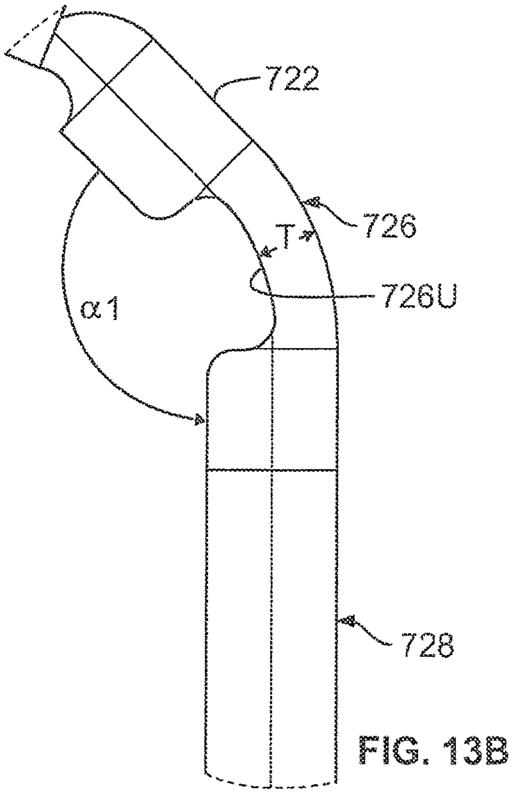
FIG. 13B is a side view of the razor portion of FIG. 13A.

FIGS. 13A and 13B show a joint 726 with a substantial angle $\alpha 1$ of approximately 95 to 175 degrees, in the initial position IP. The joint 726 has an undercut 726U (generally similar to undercut 226U) that reduces the front-to-back thickness T of the joint 726 thereby rendering the joint 726 more flexible to more readily assume a displaced position DP (see FIG. 1B or 10B) when loaded. Undercut 726U is located at the front of joint 726. As in FIGS. 2, 4B, and 11, the lower portion 728 may be forked, having fork tines like 28F1 and 28F2, 228F1 and 228F2, and 528F1 and 528F2. As noted above with respect to prior embodiments, the joint 726 may be glued or plastic welded to the upper portion 722 and the lower portion 728. In a further alternative, if the upper and lower portions of the handle 722, 728 are made from an elastomer or other compliant, resilient material, such as rubber, plastic, silicone rubber, or other natural or synthetic flexible material that has elasticity and elastic memory permitting deformation from and return to an initial position, the joint 726 may be made monolithically, the flexibility of the joint 726 being determined by the dimensions of the undercut 726U and thickness T.

Figure 15:
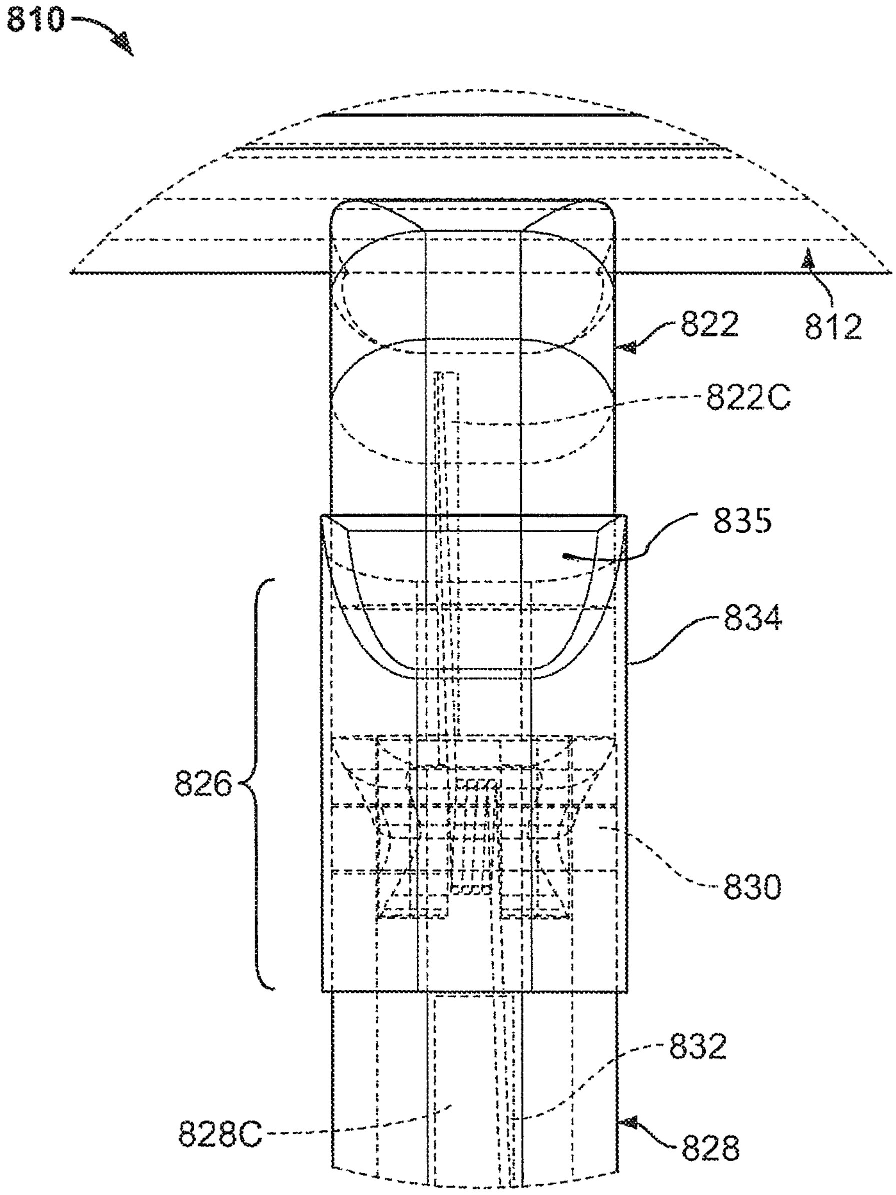
FIG. 15 is an enlarged, partially phantom view of a portion of the razor of FIG. 14.

FIGS. 14 and 15 show a razor 810 wherein an articulable joint 826 is defined by the pivotal connection of the first or upper portion 822 and the second or lower portion 828 of the razor 810 by a pivot pin 830. The upper portion 822 executes an angle $\alpha 2$ of approximately 95 to 175 degrees between its conjunction with the head 812 and a forked extension 822F. The forked extension 822F has tines 822F1, 822F2 with apertures 822A1, 822A2 to receive the pivot pin 830 there through. The lower portion 828 has a recess 828R into which the forked extension 822F may be inserted and which has apertures 828A1, 828A2 capable of accommodating the pivot pin 830. If desired, the second or lower portion 828 may have the forked extension and the first or upper portion 822 may have the recess. A torsion spring 832 may be positioned coaxially about the pivot pin 830 and extend into cavities 822C and 828C in the upper and lower portions 822, 828 to resiliently bias the joint 826 to an initial position IP (See FIG. 1B or 10B). A flexible sleeve 834, e.g., made from an elastomer or other compliant, resilient material, such as rubber, plastic, silicone rubber, or other natural or synthetic flexible material, may be positioned over the assembled joint to retain the pivot pin 830, and to obscure the joint 826 for aesthetic reasons and/or to exclude contaminants, water, soap, etc. from the joint 826 and the interior hollows, e.g., 828R, 822C, 828C of the upper and lower portions 822, 828.

The embodiment of FIGS. 14-15 is particularly advantageous in providing the desired resistance or resiliency for the user during shaving. Sleeve 834 cooperates with spring 832 in obtaining this resistance. The combination of spring 832 which provides flexibility and sleeve 834 which provides resistance (or of spring 332 and sleeve 334) might be considered as resilient/flexible structure which urges joint 826 to its initial position. As illustrated, sleeve 834 extends over the first or upper portion 822 where the end 833 of spring 832 is located. Because sleeve 834 is resilient, its resistance to bending urges sleeve 834 (or sleeve 334) to retain its shape. Accordingly, sleeve 834 resists the pivoting of the handle at pin 830 in opposition to the force applied by the user when the blade is against the user's skin when shaving. The degree of resistance of sleeve 834 is controlled by the later discussed resilient characteristics of sleeve 834. Since the cost of a sleeve would be less than the cost of a precision spring, the flexibility of joint 826 can be more economically and precisely controlled by the proper selection of a sleeve which would permit the use of a looser less precisely selected and less costly spring. The use of the sleeve also permits the use of one spring for all shavers (and, thus, lower cost), rather than different springs of a variety of resistances to change the resistance of the shaver. The resistance is a result of the sleeve rather than the spring—the flexibility of the springs is constant and the resistance of the sleeves differs.

As illustrated in FIG. 14, the razor 810 has a side profile where blade head 812 is at the front and pin 830 extends from side to side. The resistance from sleeve 834 is controlled by the area or portion 835 of sleeve 834 located at the rear of the handle profile which is the resistance portion of the sleeve. The resistance which urges the handle toward its initial position IP is thereby a combination of the spring resistance and the sleeve resistance.

In FIGS. 14-15 the resistance portion 835 of sleeve 834 could be made of different or of the same material as the remainder of the sleeve. Resistance portion 835 could be indented inwardly of the remainder of the sleeve 834, as illustrated, or could be made from the same material and not have any indentation such as in sleeve 334 of FIG. 5. Thus sleeve 834 (or sleeve 334) could have an area 835 at the rear of the handle of greater or less resistance than the remainder of the sleeve or the entire sleeve could have the same resistance. The resistance of the sleeve could be greater than the resistance of spring 832 (or spring 332). Sleeve 834 could be straight as shown in FIG. 14 or could be curved as is sleeve 334 in FIG. 5. When the resistance area of sleeve 334 or sleeve 834 is not indented, the sleeve would have a straight linear profile for snugly fitting against handle portions 322, 328 as in FIG. 5-6 or 822, 828 as in FIGS. 14-15. If the sleeve includes an area 835 which is indented then the remainder of the sleeve would have a straight linear profile. The sleeve could thus take four different forms. In one form, as illustrated in FIGS. 5-6, the sleeve is curved and has no indented resistance portion. Alternatively, the sleeve could be curved with an indented resistance portion. The other two forms would be similar to that of FIGS. 14-15 where the sleeve is straight with an indented resistance portion 835 or where the entire sleeve could be made of the same material without an indented resistance portion.

Various factors control the resistance of sleeve 834 (or sleeve 334). One factor is the material or materials used to make the sleeve, and another factor is the space or distance where the sleeve 834 contacts the top 822 and the bottom 828 of the handle. The sleeve 834 may be made of (or use a combination of) a flexible plastic, rubber, and/or synthetic rubber. The decision regarding the material to be used will depend upon the tolerance of manufacturing the razor, in general, and the sleeve, in particular. If the sleeve 834 is made solely of plastic, then the resistance of the sleeve will be determined by the resilience of the plastic. If the sleeve 834 uses rubber or synthetic rubber, then the sleeve 834 may be made (a) solely of rubber or synthetic rubber, or (b) the sleeve may be made of plastic with rubber or synthetic rubber inside the plastic sleeve to act as a high-friction material. If the sleeve 834 uses high-friction material, then the resistance also will be controlled by the distance between the sleeve 834 and portions 822 and 828. The less the distance, then greater the resistance; the greater the distance, then the less the resistance. The distance combined with the high-friction material will control the resistance.

As illustrated in FIG. 15 the inner surface of sleeve 834 (and the inner surface of sleeve 334 in FIG. 6) makes complete surface to surface contact with the first and second portions of the handle at the joint 826. Accordingly, the inner surface is of smooth linear unbroken shape which maximizes the resistive force of sleeve 834 by maximizing its area of contact with portions 822 and 828 in contrast, for example, to a corrugated surface. The outer surface of sleeves 334 and 834 is also of smooth linear unbroken shape.

Alternatively, the sleeve, and particularly its inner surface, could be corrugated. For example, a plastic sleeve may be provided with rubber ridges and grooves against a smooth handle. In further variations, the handle could be corrugated and disposed against the inner surface of a sleeve which is smooth or is corrugated.

As illustrated in FIGS. 14 and 15 sleeve 834 is mounted to the handle over portions 822 and 828 by virtue of the resiliency of the sleeve and thus is free of any external fastening elements.

FIG. 14 illustrates the first or upper portion 822 and the second or lower portion 828 to be connected together where the adjoining parts of those portions are collinear with each other and the sleeve 834 is confined to the collinear parts of the first portion and the second portion. FIG. 5, however, shows the first or upper portion 322 and the second or lower portion 328 to be connected together at a curved part of the handle and the sleeve 334 is located at and conforms to the curved part and to the straight parts of the handle.

Since different users would prefer different degrees of resistance the invention could be practiced by permitting the user to select the desired resistance of the sleeve by providing a set of sleeves (FIG. 14A) differentiated from each other by indicia such as color coding or an alphanumeric indicia (e.g. H, M, L). The sleeves 834 could be provided in a set of such differing resistances and the user could select and attach the proper sleeve. This could be done by either removing the pin 830 and then inserting the sleeve on the second or lower portion, replacing the pin and sliding the sleeve upwardly. Alternatively, the sleeve could have a longitudinal slit 837 and the edges of the slit could be of hooked shape so that the slit could be unhooked whereby the sleeve could be spread open for attachment and then the hooks reengaged after attachment. In addition to the sleeve providing resistance, the resistance of the spring could be adjusted such as from the use of a screw or dial connected to the spring with the screw or dial extending outwardly through the sleeve for access by the user, although this alternative is less preferred.

Figure 16:
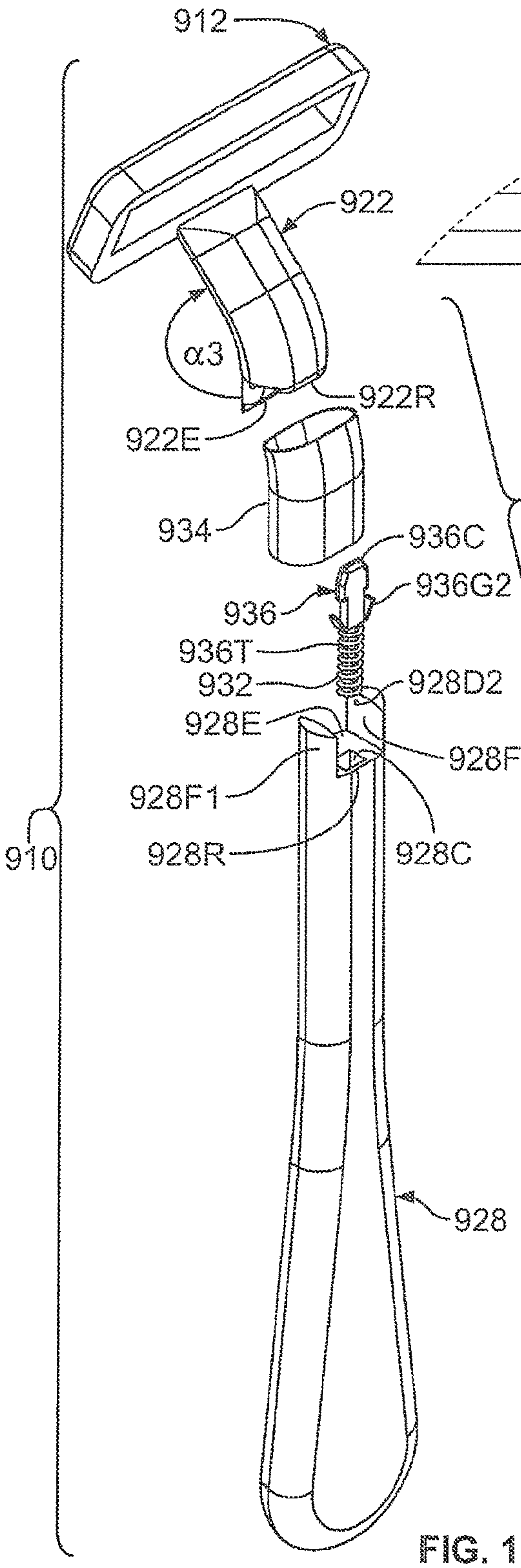
FIG. 16 is an exploded view of a razor in accordance with an alternative embodiment of the present disclosure.
Figure 17:
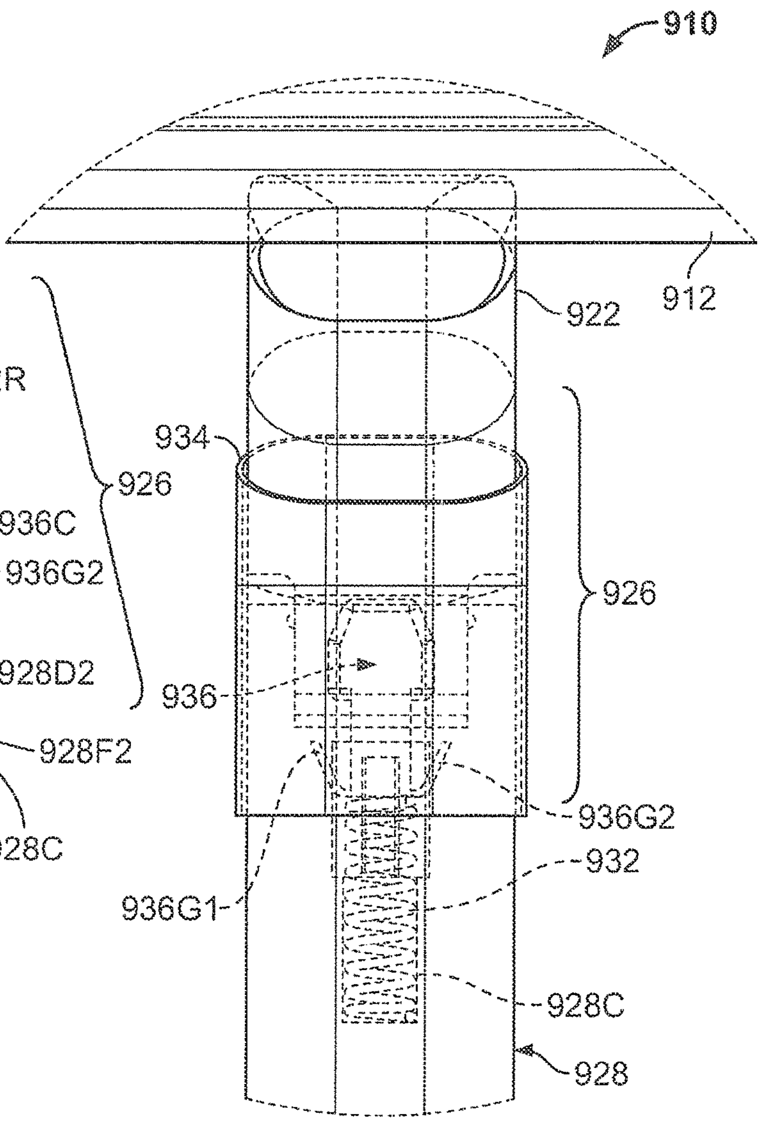
FIG. 17 is an enlarged, partially phantom view of a portion of the razor of FIG. 16.
Figure 18:
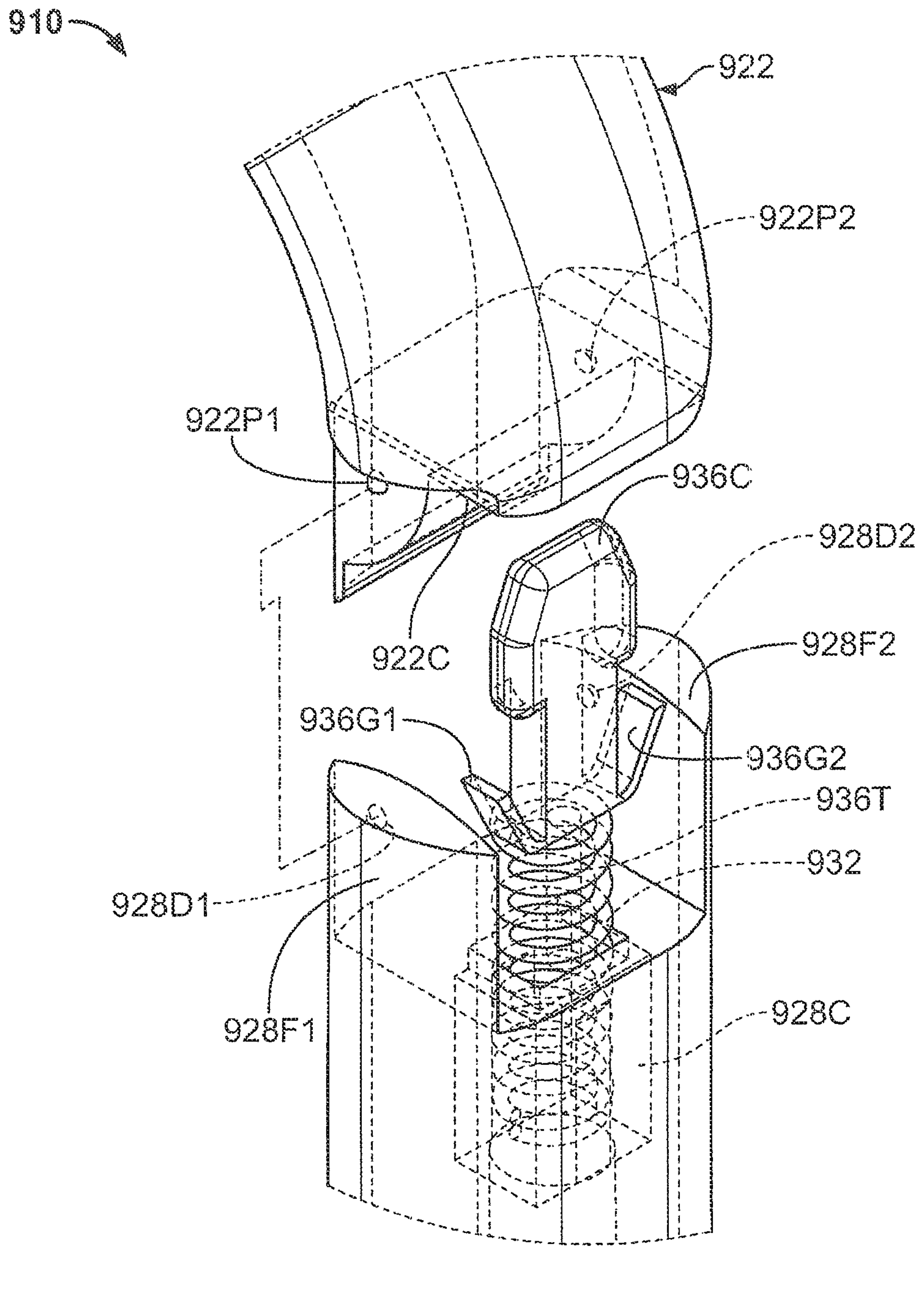
FIG. 18 is an enlarged, exploded, perspective view of a portion of the razor of FIGS. 16 and 17.

FIGS. 16, 17 and 18 show a razor 910 in accordance with an alternative embodiment of the present disclosure. The joint 926 is defined by the pivotal connection of the upper portion 922 and lower portion 928 of the razor 910 by a pivot joint including opposed projections 922P1, 922P2 extending from opposed sides of upper portion 922, which are received in mating depressions 928D1, 928D2 provided on an inside surface of forks 928F1, 928F2. The upper portion 922 executes an angle $\alpha 3$ of approximately 95 to 175 degrees between its conjunction with the head 912 and a terminal edge 922E. The lower portion 928 of the razor 910 is made from elastic materials such as rubber, plastic, silicone rubber, or other natural or synthetic flexible material, and, thus, the upper portion 922 may be snap-fitted to the bottom portion 928 by the outward bending of the forks 928F1, 928F2 to allow the projections 922P1, 922P2 to enter the depressions 928D1, 928D2 and then snap back to form a pivotal joint. The lower portion 928 has a spring channel 928C into which a coil spring 932 may be inserted to resiliently bias the joint 926 to an initial position IP (See FIG. 1B or 10B). A plunger 936 intermediates between the spring and the upper portion 922. More particularly, the plunger 936 has an upper cam surface 936C that abuts against a cam surface 922C on the upper portion 922. The plunger 936 also features a tail portion 936T that extends into the internal hollow of the spiral spring 932 to keep the plunger 936 oriented with the axis of the spring 932. The plunger 936 has a pair of guides 936G1, 936G2 that extend from side surfaces of the plunger 936 and which bend to enter and engage the spring channel 928C to stabilize and orient further the plunger 936 relative to the spring channel 928C. A flexible sleeve 934, e.g., made from an elastomer or other compliant, resilient material, such as rubber, plastic, silicone rubber, or other natural or synthetic flexible material, may be positioned over the assembled joint 926 to obscure the joint 926 for aesthetic reasons and/or to exclude contaminants, water, soap, etc. from the joint 926 and the interior hollows, e.g., 928C, of the lower portion 428. The strength and length of the spring 932 may be selected to achieve a selected degree of preload that maintains the upper portion 922 at a given initial position IP (See FIGS. 1B and 10B), the spring resiliently forcing the plunger 936 and the cam surface 936C thereof into contact with the cam surface 922C of the upper portion 922. When bending forces are encountered, e.g., F1, F2 shown in FIG. 1B, the head 912 and attached upper portion 922 are pivoted back on projections 922P1, 922P2 and depressions 928D1, 928D2, encountering the plunger 936 and compressing the spring 932. When the bending forces are removed, the razor 910 reassumes the initial position IP. The movement of the joint 926 may be limited, e.g., between the initial position IP and a maximum displaced position by a mechanical stop. For example, the forward edge 922E may abut surface 928E in the initial position IP and the rear edge 922R may abut surface 928R in a maximally displaced position DP.

It will be understood that the embodiments described herein merely are exemplary and that a person skilled in the art may make many variations and modifications without departing from the spirit and scope of the claimed subject matter. For example, while this disclosure is directed to a razor and shaving, the articulable handle disclosed may be used to mount a scrubbing device, such as an exfoliating or abrasive block that is passed over the skin to clean or abrade the surface of skin. It is also to be understood, that the invention may be practiced by incorporating one or more features of any embodiment into other embodiments. All such variations and modifications are intended to be included within the scope of the appended claims.

The invention claimed is:

1. A razor comprising a head containing at least one blade, a handle connected to the head, the handle having a first portion and a second portion, the first portion being closer to the head than the second portion, the first portion and the second portion being pivotally mounted together by a pivot joint whereby a force created during use of the razor when the blade is pressed against skin of a user urges the first portion to rotate about the joint and move in a path of motion away from an initial non-use position, a plunger extending longitudinally between the first portion and the second portion and in the path of motion of the first portion, the plunger having a tail, the second portion having a spring channel, wherein the tail is positioned in the spring channel, a resilient spring positioned over the plunger tail, the spring extending longitudinally into the spring channel and reacting against the first portion to create resistance to the force and to urge the first portion toward the initial position, a sleeve being mounted over the first portion and the second portion and completely covering the joint, and the sleeve being resilient and being disposed against the first portion to create resistance to the force and to urge the first portion to the initial position.

2. The razor of claim 1 wherein the first portion includes outwardly extending projections engaged in depressions in the second portion to form the pivot joint.

3. The razor of claim 2 wherein the second portion terminates in spaced bendable forks adjacent to the first portion, the depressions being in the spaced forks, and the first portion being snapped into the second portion.

4. The razor of claim 1 wherein the first portion is snapped into the second portion to form the pivot joint.

5. The razor of claim 1 wherein the tail extends from a wider portion of the plunger, the spring abutting against the wider portion, and the narrowed tail orienting the plunger with a longitudinal axis of the spring.

6. The razor of claim 5 wherein the plunger includes a cam surface.

7. The razor of claim 6 wherein the plunger has guides which engage the spring channel to stabilize and orient the plunger with the spring channel.

8. The razor of claim 7 wherein the guides are bendable.

9. The razor of claim 8 wherein the first portion makes an angle of 95 to 175 degrees with the head.

10. The razor of claim 1 wherein the plunger has bendable guides which engage the spring channel to stabilize and orient the plunger with the spring channel.

11. The razor of claim 1 wherein the second portion has a stop surface in the path of motion of an edge of the first portion to form a stop which limits pivotal movement of the first portion.

12. A razor comprising a head containing at least one blade, a handle connected to the head, the handle having a first portion and a second portion, the first portion being closer to the head than the second portion, the first portion and the second portion being pivotally mounted together by a pivot joint whereby a force created during use of the razor when the blade is pressed against skin of a user urges the first portion to rotate about the joint and move in a path away from an initial non-use position, a plunger extending longitudinally between the first portion and the second portion and being in the path of motion of the first portion, the plunger having a cam surface positioned for contacting a cam surface of the first portion, a spring channel in the second portion, the plunger having a tail positioned in the spring channel extending into a spring, the spring being mounted in the spring channel.

13. The razor of claim 12 wherein the narrowed tail extends from a wider portion of the plunger, the spring abutting against the wider portion, and the narrowed tail orienting the plunger with a longitudinal axis of the spring.

14. The razor of claim 13 wherein the plunger has guides which engage the spring channel to stabilize and orient the plunger with the spring channel.

15. The razor of claim 14 wherein the guides extend outwardly from the plunger, and the guides are bendable.

16. The razor of claim 12 wherein the plunger has outwardly extending bendable guides which engage the spring channel.

17. The razor of claim 12 wherein the first portion includes outwardly extending projections positioned in depressions of the second portion to form the pivot joint.

18. The razor of claim 17 wherein the second portion terminates in spaced bendable forks adjacent to the first portion, the depressions being in the bendable forks, and the first portion being snapped into the second portion.

19. The razor of claim 12 wherein the second portion has a stop surface in the path of motion of an edge of the first portion to form a stop which limits pivotal movement of the first portion.

20. The razor of claim 12 wherein a sleeve is mounted over the first portion and the second portion and completely covers the pivot joint.

* * * * *